(12) United States Patent
Sameshima et al.

(10) Patent No.: US 10,434,692 B2
(45) Date of Patent: Oct. 8, 2019

(54) MOLD FOR IN-MOLD FOAM MOLDING OF POLYOLEFIN-BASED RESIN, METHOD FOR MANUFACTURING IN-MOLD FOAMING MOLDED ARTICLE, AND IN-MOLD FOAMING MOLDED ARTICLE

(71) Applicant: Kaneka Corporation, Osaka (JP)

(72) Inventors: Masahiko Sameshima, Osaka (JP); Yuki Tobimatsu, Osaka (JP)

(73) Assignee: KANEKA CORPORATION, Osaka (JP)

( * ) Notice: Subject to any disclaimer, the term of this patent is extended or adjusted under 35 U.S.C. 154(b) by 131 days.

(21) Appl. No.: 15/292,620

(22) Filed: Oct. 13, 2016

(65) Prior Publication Data

US 2017/0057130 A1    Mar. 2, 2017

Related U.S. Application Data

(63) Continuation of application No. PCT/JP2015/059884, filed on Mar. 30, 2015.

(30) Foreign Application Priority Data

Apr. 15, 2014   (JP) ................. 2014-083553

(51) Int. Cl.
   *B29C 33/20*   (2006.01)
   *B29C 44/58*   (2006.01)
   *B29C 44/12*   (2006.01)
   *B29C 33/14*   (2006.01)
   *B29C 44/44*   (2006.01)
   (Continued)

(52) U.S. Cl.
   CPC .......... *B29C 44/1233* (2013.01); *B29C 33/14* (2013.01); *B29C 44/1271* (2013.01);
   (Continued)

(58) Field of Classification Search
   CPC ..... B29C 33/12; B29C 33/14; B29C 44/1233; B29C 44/1271; B29C 44/588;
   (Continued)

(56) References Cited

U.S. PATENT DOCUMENTS 4,999,227 A      3/1991   Vander Togt
5,356,029 A  *  10/1994   Hogan ................. B65D 77/061
                                                                        222/105
(Continued)

FOREIGN PATENT DOCUMENTS

DE          3009552 A1     9/1981
JP       H03161312 A      7/1991
(Continued)

OTHER PUBLICATIONS

Machine translation of JP 2003/236855 A, obtained from Industrial Property Digital Library of the JPO on Jun. 15, 2017.*
(Continued)

*Primary Examiner* — Seyed Masoud Malekzadeh
(74) *Attorney, Agent, or Firm* — Osha Liang LLP

(57) ABSTRACT

A mold for in-mold foam molding of polyolefin-based resin that prevents the occurrence of burrs at the time of molding to control productivity reduction and labor cost rising caused by burr trimming. A mold is configured to mold an insert member including an embedded part to be embedded into a foaming molded body formed from a polyolefin-based resin and a protrusion part protruding from the foaming molded body integrally with the foaming molded body. The mold is provided with an accommodation concave part capable of accommodating the protrusion part and an opening/closing part capable of opening and closing a cavity-side opening in conjunction with insertion and extraction of the protrusion part into and from the accommodation concave part such that, while the protrusion part is inserted into the accommodation concave part, and the cavity-side opening is closed.

21 Claims, 13 Drawing Sheets

(51) Int. Cl.
*B29K 105/04* (2006.01)
*B29K 705/00* (2006.01)
*B29L 31/30* (2006.01)
*B29L 31/00* (2006.01)
*B29L 31/58* (2006.01)
*B29C 33/12* (2006.01)
*B29K 23/00* (2006.01)
*B29C 44/34* (2006.01)

(52) U.S. Cl.
CPC ............ *B29C 44/445* (2013.01); *B29C 33/12* (2013.01); *B29C 44/1214* (2013.01); *B29C 44/3426* (2013.01); *B29C 44/588* (2013.01); *B29K 2023/06* (2013.01); *B29K 2023/12* (2013.01); *B29K 2105/048* (2013.01); *B29K 2705/00* (2013.01); *B29L 2031/30* (2013.01); *B29L 2031/58* (2013.01); *B29L 2031/771* (2013.01)

(58) Field of Classification Search
CPC ..... B29C 44/1214; B29C 33/16; B29C 33/20; B29C 33/202; B29C 33/205; B29C 33/207; B29C 33/26; B29C 33/30; B29C 33/302; B29C 33/306; B29C 33/32; B29C 44/445
See application file for complete search history.

(56) References Cited

U.S. PATENT DOCUMENTS

| | | | | |
|---|---|---|---|---|
| 6,500,368 | B1* | 12/2002 | Sameshima | B29C 44/3419 264/40.6 |
| 6,558,592 | B1* | 5/2003 | Nohara | B29C 44/58 264/51 |
| 6,619,943 | B1* | 9/2003 | Sameshima | B29C 44/0469 425/130 |
| 6,800,227 | B1* | 10/2004 | Nohara | B29C 44/445 264/126 |
| 9,493,622 | B2* | 11/2016 | Yoshida | C08J 9/18 |
| 2003/0209828 | A1* | 11/2003 | Nohara | B29C 44/445 264/109 |
| 2006/0145490 | A1* | 7/2006 | Yamaguchi | B60R 19/18 293/109 |

FOREIGN PATENT DOCUMENTS

| | | |
|---|---|---|
| JP | H10329154 A | 12/1998 |
| JP | 2001145930 A | 5/2001 |
| JP | 2003236855 A | 8/2003 |
| JP | 2007261190 A | 10/2007 |
| JP | 2009023211 A | 2/2009 |
| JP | 2011020417 A | 2/2011 |
| JP | 2012218236 A | 11/2012 |
| JP | 2013035335 A | 2/2013 |

OTHER PUBLICATIONS

Machine translation of JP 2012/218236 A, obtained from Industrial Property Digital Library of the JPO on Jun. 15, 2017.*
International Search Report issued in corresponding International Application No. PCT/JP2015/059884 dated Jun. 23, 2015 (5 pages).
Extended European Search Report issued in European Application No. 15779421.5; dated Dec. 1, 2017 (10 pages).

* cited by examiner

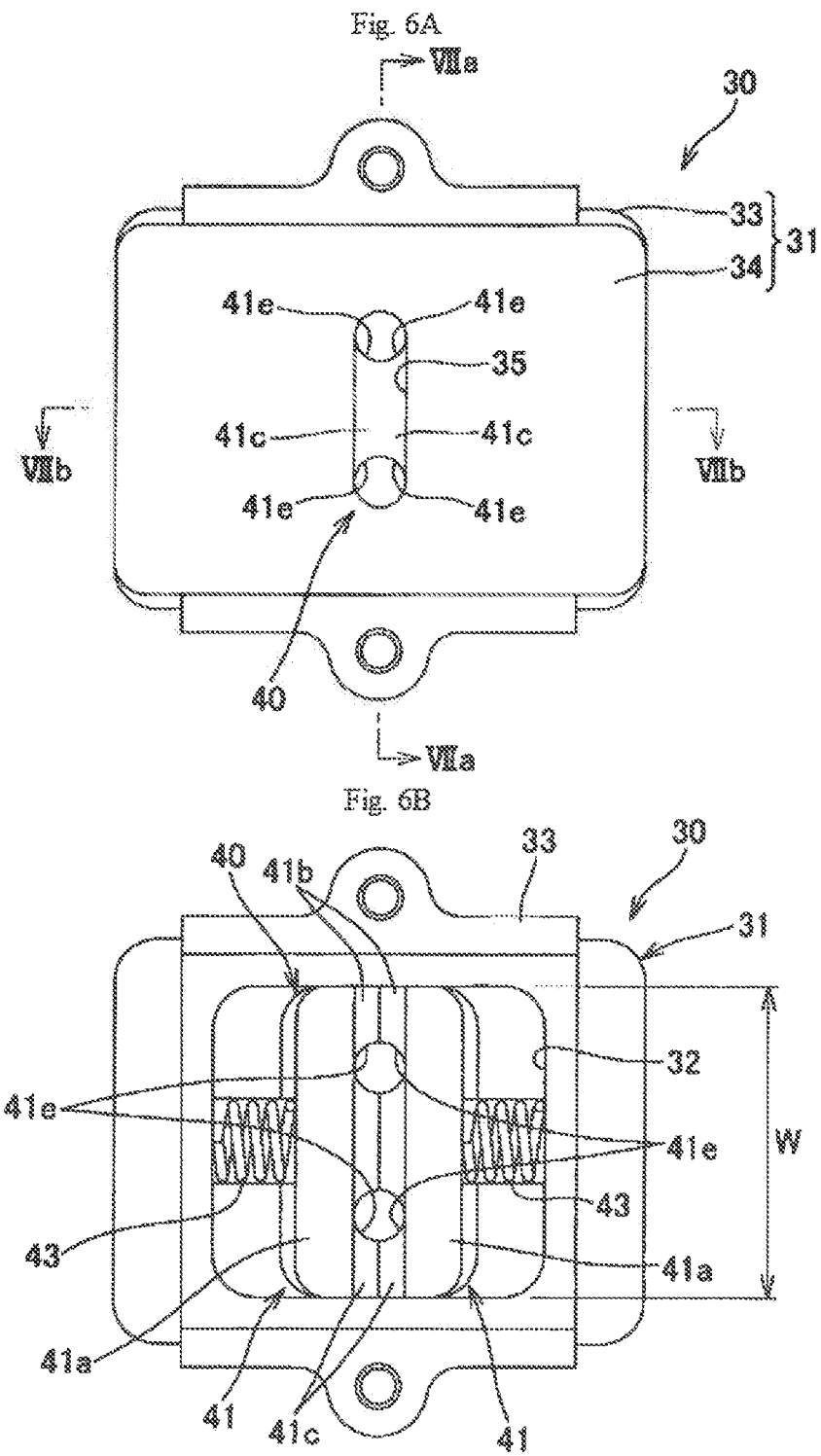

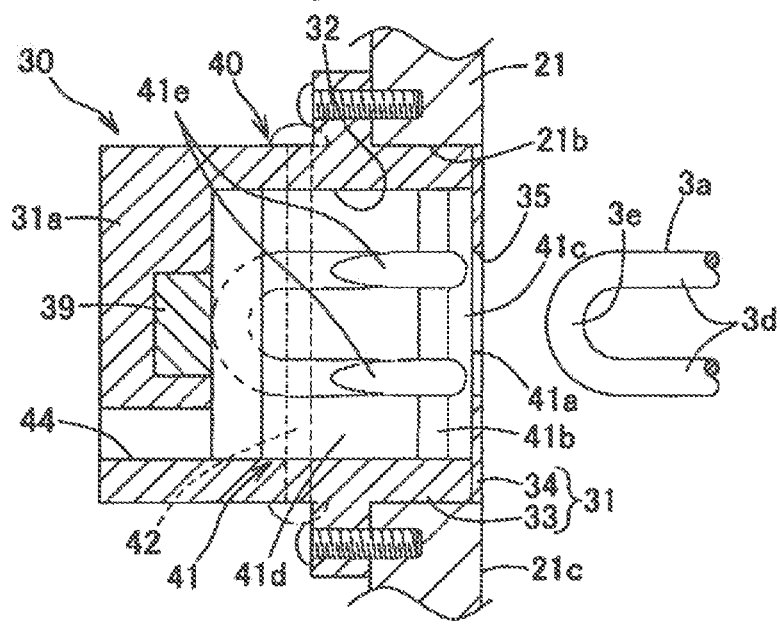
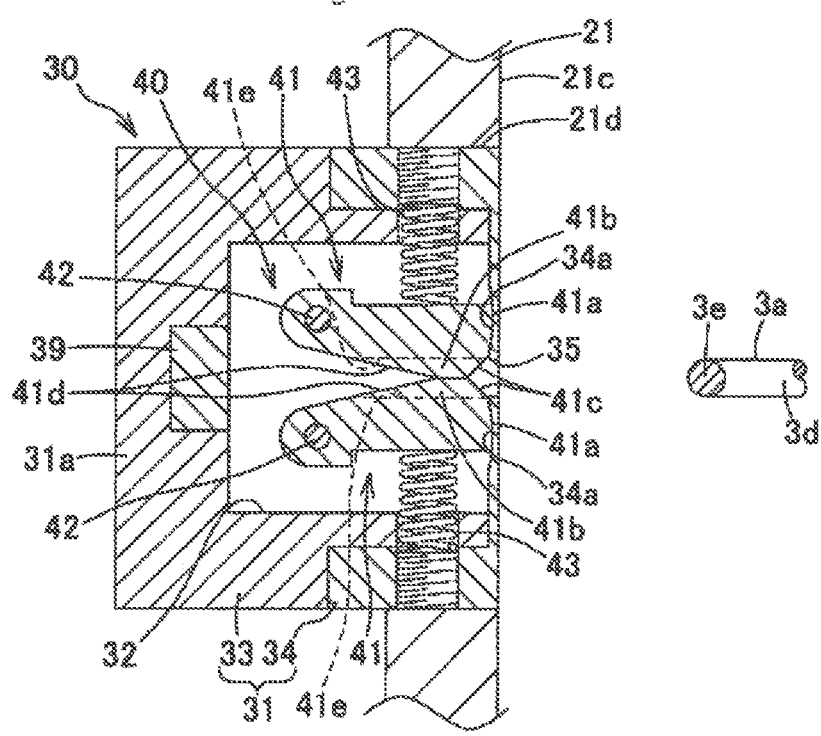

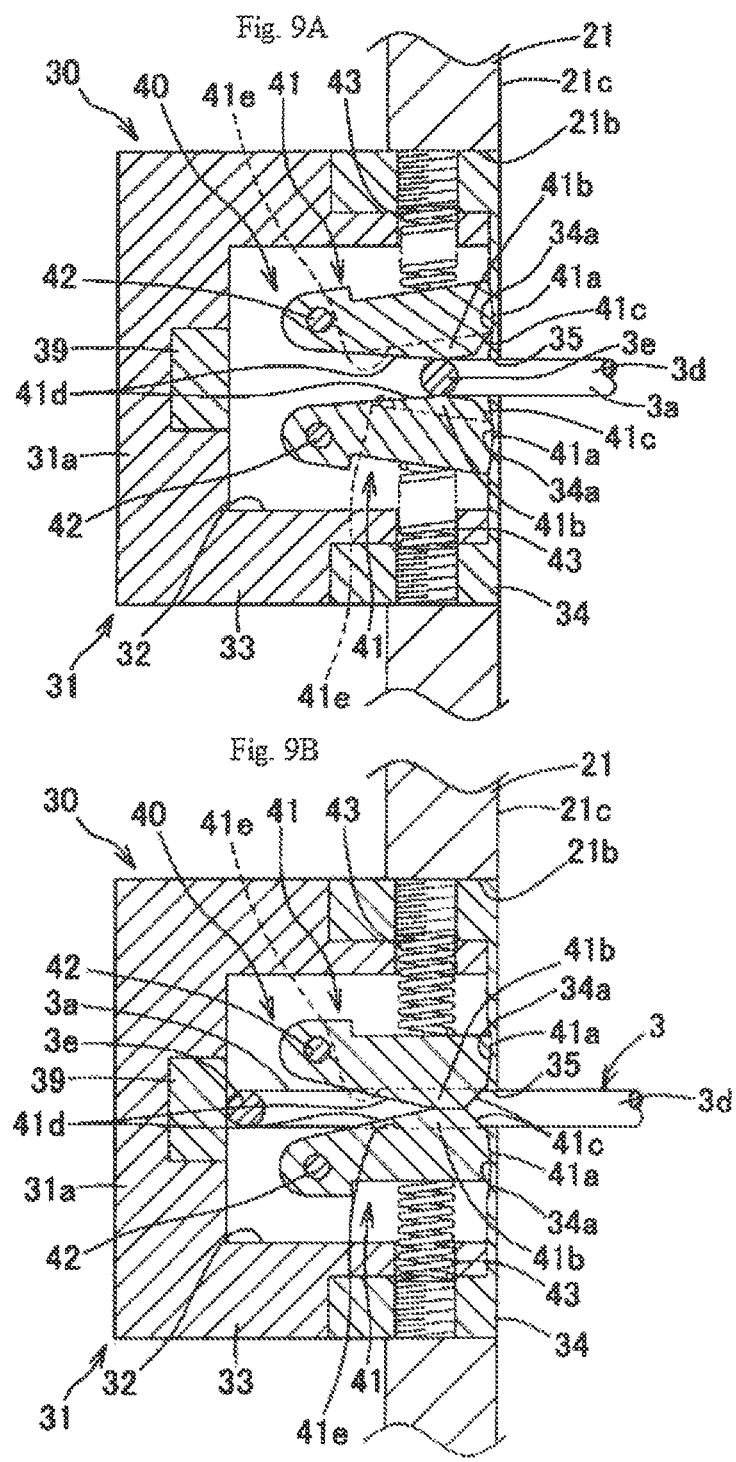

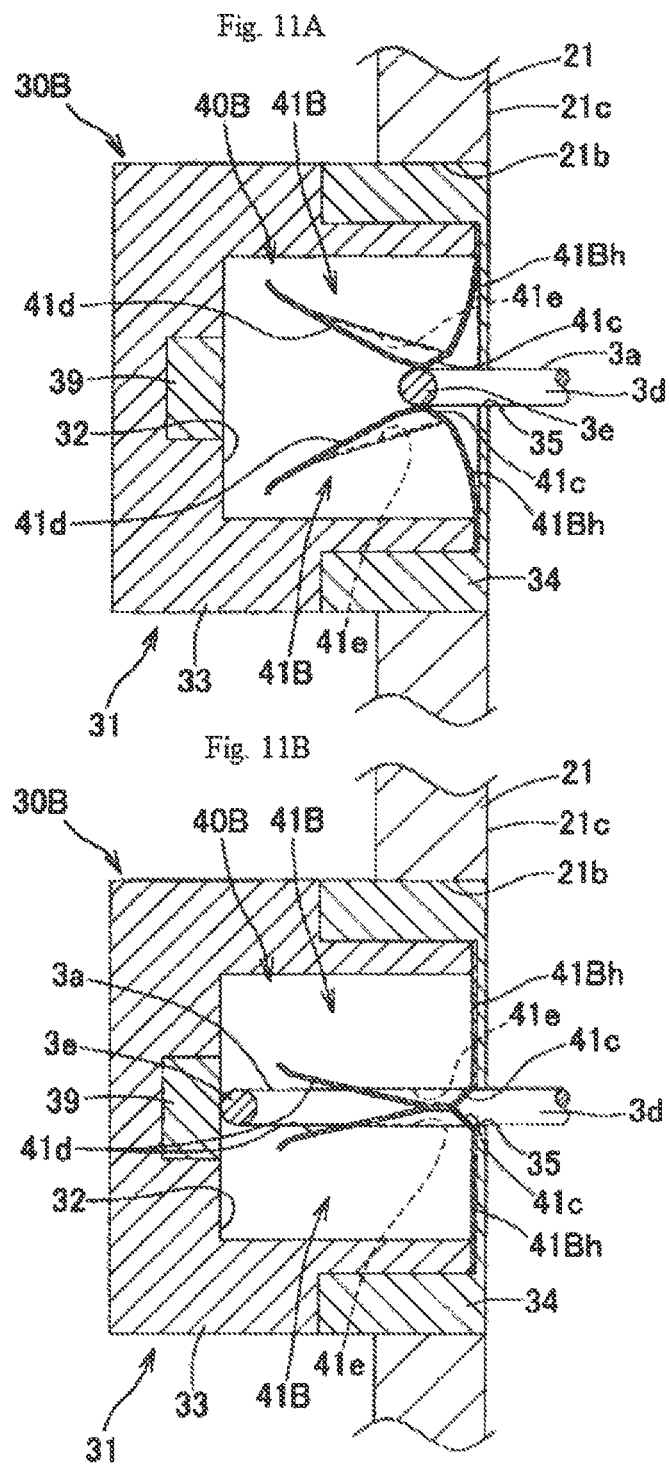

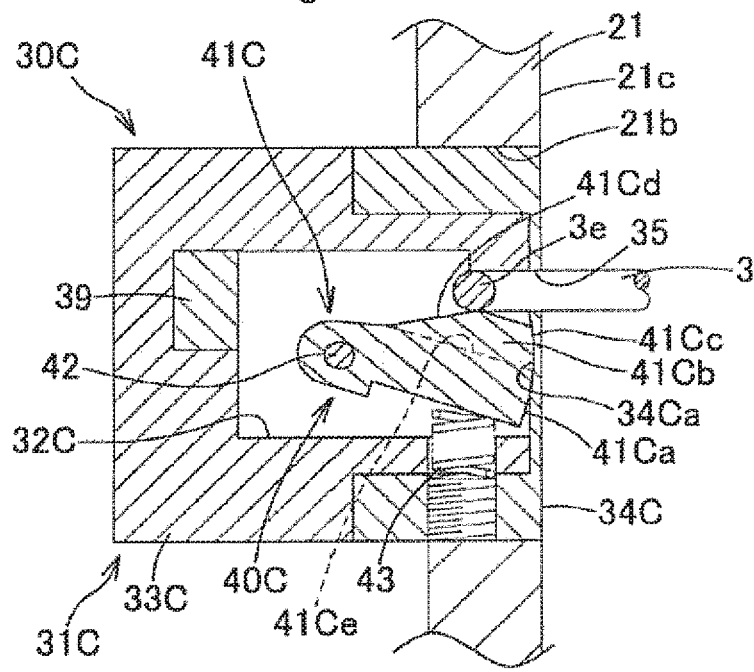
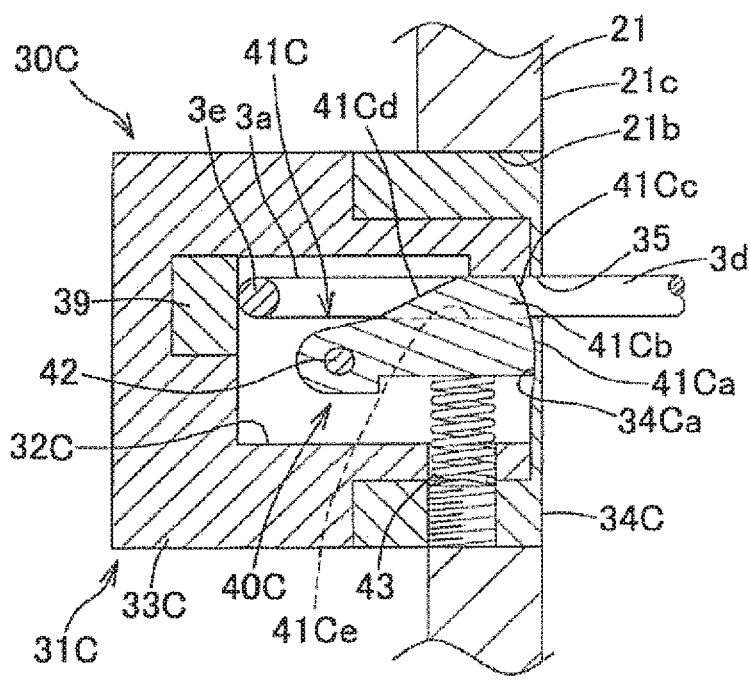

MOLD FOR IN-MOLD FOAM MOLDING OF POLYOLEFIN-BASED RESIN, METHOD FOR MANUFACTURING IN-MOLD FOAMING MOLDED ARTICLE, AND IN-MOLD FOAMING MOLDED ARTICLE

TECHNICAL FIELD

The present invention relates to a mold for in-mold foam molding of polyolefin-based resin in which an in-mold foaming molded article is formed by insert-molding an insert member with a protrusion part into a foaming molded body, a method for manufacturing an in-mold foaming molded article, and the in-mold foaming molded article.

BACKGROUND

In recent years, there have been developed techniques for inserting a metallic wire or a metallic part into an in-mold foaming molded body for use in vehicles and molding them simultaneously. As an example of component into which a metallic wire is inserted, there is a seat core material for vehicles, for example. The seat core material has as a foam a polyolefin-based resin foaming molded body higher in strength than urethane to provide the advantage of reducing significantly the amount of the metallic wire that has been used to hold the shape of the seat, thereby resulting in weight saving. As another case, there has been proposed a technique for inserting a metallic part to be attached to a vehicle beam into a vehicle bumper core material formed from a foaming molded body and molding them integrally to fix the bumper core material more firmly to the vehicle. In addition, as still another case, there has been proposed a technique for molding a metallic part integrally with a headrest formed from a foaming molded body to not only produce the stronger and safer component but also decrease the number of components, thereby advantageously improving workability and achieving cost cutting.

However, in order to fix the foaming molded article to the vehicle, the foaming molded article needs to have metallic fastening members composed of U- or V-shaped hooks and protruding toward the outside. However, this leads to the occurrence of large burrs around the protrusion parts of the fastening members protruding from the foaming molded article, in particular, inside the protrusion parts composed of hooks. The burrs have to be trimmed off after the molding, which causes significant decrease in productivity.

Meanwhile, various methods have been used to prevent the occurrence of burrs in a foaming molded body. For example, Patent Document 1 discloses an invention of urethane molding in which a gasket is applied to the juncture of mold such that the gasket protrudes toward the inside of the mold at the time of mold clamping to prevent overflow of a urethane resin from a parting surface. In addition, Patent Document 2 discloses an invention of a method for preventing the occurrence of burrs on a parting surface in in-mold foam molding by which the parting surface of the mold is formed in a concave shape such that burrs fall within the concave part of the molded product. Further, Patent Document 3 discloses a technique for preventing the occurrence of burrs on places other than the parting surface by which the partitioning part of the mold with a partitioning plate for simultaneously molding preparatory foaming particles with different properties is protruded toward the product side such that burrs fall within a groove in the product. However, none of the inventions disclosed in Patent Documents 1 to 3 are applicable as a method for preventing the occurrence of burrs around the fastening members.

CITATION LIST

Patent Literature

Patent Document 1: JP-A No. 2009-023211
Patent Document 2: JP-A No. 2007-261190
Patent Document 3: JP-A No. 2001-145930

SUMMARY OF INVENTION

At the formation of the foaming molded body with the fastening members as described above, burrs occur inevitably inside the fastening members composed of U- or V-shaped hooks. If the burrs are not trimmed off but are left uncontrolled after the molding, the product may be deteriorated in appearance due to the burrs and the burrs may fall off at the time of assembly of the product, for example. Accordingly, the burrs need to be trimmed by hand work after the molding, which is very time-consuming and troublesome work. It may not cause so much trouble in small-lot production. However, in mass production, a great deal of human hand and time is necessary to trim off the burrs. This reduces significantly productivity and results in labor cost increase.

One or more embodiments of the present invention is to provide a mold for in-mold foam molding of polyolefin-based resin that prevents the occurrence of burrs around the protrusion parts of insert members protruding from a foaming molded body toward the outside in a mold opening/closing direction at the time of molding to control productivity reduction and labor cost rising caused by burr trimming, a method for manufacturing an in-mold foaming molded article, and the in-mold foaming molded article.

A mold for in-mold foam molding of polyolefin-based resin according to the present invention is the mold for molding an insert member integrally with a foaming molded body, the insert member including an embedded part to be embedded into the foaming molded body formed from a polyolefin-based forming resin and a protrusion part protruding from the foaming molded body toward the outside, wherein the mold for in-mold foam molding of polyolefin-based resin includes; an accommodation concave part capable of accommodating the protrusion part, and an opening/closing means having an opening/closing part capable of opening and closing a cavity-side opening of the accommodation concave part in conjunction with insertion and extraction of the protrusion part into and from the accommodation concave part, so as to close the cavity-side opening in a state that the protrusion part is inserted into the accommodation concave part. The mold of the present invention is suitable for molding a molded article with a protrusion part shaped such that, when the insert member is attached to the mold and the protrusion part is inserted into the accommodation concave part, a gap of size allowing the entry of pre-expanded beads would be inevitably formed between the rim of the cavity-side opening in the accommodation concave part and the outer periphery of a base portion of the protrusion part. The protrusion part is used to fix the molded article, to couple another object to the molded article, or the like. The protrusion part protrudes from the foaming molded body toward the outside in the mold opening/closing direction at the time of molding. The protrusion part is configured such that the transverse cross-sectional area of the base end is smaller than the projection area in the mold opening/ closing direction. Specifically, the protrusion part can be composed of a hook part including a female hook such as U- or V-shaped, a male hook such as J- or L-shaped, or can be composed of a bolt with a head arranged on the leading end, an eyebolt with an eye on the leading end, or the like.

In the mold for in-mold foam molding, when the protrusion part of the insert member is inserted into the accommodation concave part to set the insert member in the cavity, the cavity-side opening is closed by the opening/closing part in the opening/closing means in conjunction with the insertion of the protrusion part, thereby to close the gap between the rim of the cavity-side opening and the outer periphery of the base portion of the protrusion part. Accordingly, after the insert member is set in the mold and the mold is closed, when pre-expanded beads are packed and the packed pre-expanded beads are thermally fused, it is possible to prevent the pre-expanded beads from entering into the gap, thereby preventing reliably the occurrence of burrs around the protrusion part of the molded article. In particular, in the case of providing, as the protrusion part, a female hook such as U- or V-shaped part having a pair of leg portions and a coupling portion for coupling the leading ends of the leg portions, if molding is performed with conventional mold without an opening/closing means, a large gap is generated between the base end portions of the leg portions in the cavity-side opening of the accommodation concave part, and burrs occur between the leg portions. However, the present invention can prevent reliably the occurrence of such burrs. In addition, when the protrusion part is operated in a direction of extraction by releasing the molded article from the mold, the cavity-side opening is opened by the opening/closing part in the opening/closing means in conjunction with the operation, whereby the protrusion part can be extracted from the accommodation concave part without reduction in productivity at the time of release from the mold. As described above, in the mold, the cavity-side opening in the accommodation concave part is opened and closed by the opening/closing means in conjunction with insertion and extraction of the protrusion part into and from the accommodation concave part. This makes it possible to prevent the occurrence of burrs around the protrusion part without reduction in workability of molding, and to eliminate the need for burr trimming, thereby achieving productivity improvement and labor cost cutting.

The opening/closing means can be any one of different opening/closing means or an arbitrary combination of more than one kind of opening/closing means.

In one embodiment, the opening/closing means includes an opening/closing part that is capable of swinging between an opening position at which the cavity-side opening is opened and a closing position at which the cavity-side opening is closed, and a biasing means for biasing constantly the opening/closing part to the closing position. The opening/closing part includes an insertion-side opening operation part that abuts on the protrusion part and operates the opening/closing part to the opening position according to the insertion of the protrusion part into the accommodation concave part, and an extraction-side opening operation part that abuts on the protrusion part and operates the opening/closing part to the opening position according to the extraction of the protrusion part from the accommodation concave part.

In another embodiment, the opening/closing means includes an opening/closing part that is capable of swinging between an opening position at which the cavity-side opening is opened and a closing position at which the cavity-side opening is closed. The opening/closing part includes a closing operation part that abuts on the protrusion part and operates the opening/closing part to the closing position according to the insertion of the protrusion part into the accommodation concave part. In the opening/closing means, the opening/closing part is opened when the protrusion part is extracted from the accommodation concave part, and therefore the biasing means may not be necessarily provided to bias constantly the opening/closing part to the opening position. However, the opening/closing part may swing to the closing position due to vibration during the molding, the opening/closing part's weight, and the like. Thus, it is possible to provide the biasing means to bias constantly the opening/closing part to the opening position, or to provide an operation resistance provision means to provide operation resistance to the swinging of the opening/closing part by frictional resistance or the like.

In yet another embodiment, the opening/closing means includes an opening/closing part that is elastically deformable between an opening position at which the cavity-side opening is opened and a closing position at which the cavity-side opening is closed, and that is constantly biased to the closing position at which the cavity-side opening is closed. The opening/closing part includes: an insertion-side opening operation part that abuts on the protrusion part and operates the opening/closing part to the opening position according to the insertion of the protrusion part into the accommodation concave part; and an extraction-side opening operation part that abuts on the protrusion part and operates the opening/closing part to the opening position according to the extraction of the protrusion part from the accommodation concave part. In this case, the number of parts constituting the opening/closing means can be decreased.

It is also possible that the cavity-side opening is formed in a long hole shape fitting to the front shape of the protrusion part in the mold opening/closing direction. In this case, the portion of the opening/closing part exposed to the inside of the cavity through the cavity-side opening can be made as smaller as possible. Accordingly, it is possible to prevent effectively clogging of the movable part and the like of the opening/closing part with pre-expanded beads.

The opening/closing part may include a set of two opening/closing parts, the two opening/closing parts being arranged on both sides of the protrusion part in a manner to sandwich the protrusion part therebetween, and capable of opening and closing the cavity-side opening in cooperation with each other, with the protrusion part being in the accommodation concave part. In this case, although the number of parts constituting the opening/closing means increases, the gap communicating from the accommodation concave part to the inside of the cavity may be removed in almost complete manner in a state that the opening/closing part is closed.

As the opening/closing part, a single opening/closing part may be provided on one side of the protrusion part inserted in the accommodation concave part. In this case, the number of parts constituting the opening/closing means may be decreased.

The accommodation concave part may also include a magnet on a bottom surface to attract and hold the protrusion part. In this case, by the magnet attracting and holding the protrusion part, the insert member can be positioned and held into a proper position in the mold.

The accommodation concave part may also include a beads discharge hole for discharging pre-expanded beads, communicating with a steam chamber on a back side of the mold. In this case, even though some of the pre-expanded beads enter into the accommodation concave part when the pre-expanded beads are packed into the cavity, the entering pre-expanded beads can be discharged into the steam chamber through the beads discharge hole. This prevents the occurrence of burrs caused by the entry of the pre-expanded beads into the accommodation concave part and prevents defective operation of the opening/closing means due to the residual pre-expanded beads in the accommodation concave part. The diameter of the beads discharge hole may be larger than the diameter of the pre-expanded beads, such as 5 mm or more.

A maximum gap between the accommodation concave part and a cavity may be set to be 0.5 mm or more to 2.0 mm or less, in a state that the cavity-side opening is closed by the opening/closing part. With this gap, the entry of the pre-expanded beads into the accommodation concave part can be prevented. In addition, even when the pre-expanded beads facing the gap deform and some of them enter into the gap, a projection may be formed along the gap on the surface of the molded article. However, the projection would be almost less visible and not fall off.

In one or more embodiments for manufacturing an in-mold foaming molded article according to the present invention is a method for manufacturing an in-mold foaming molded article in which an insert member is integrally molded with a foaming molded body, the insert member including an embedded part to be embedded into the foaming molded body formed from a polyolefin-based foaming resin and a protrusion part protruding from the foaming molded body toward the outside, wherein the method includes: inserting the protrusion part into an accommodation concave part in a mold for in-mold foam molding; closing a cavity-side opening in the accommodation concave part by an opening/closing part in an opening/closing means provided in the mold; and closing the mold to which the insert member is attached, to mold the insert member integrally with the foaming molded body.

Accordingly, in a state that the protrusion part of the insert member is inserted into the accommodation concave part in the mold for in-mold foam molding and the insert member is attached to the mold, the cavity-side opening in the accommodation concave part is closed by the opening/closing part in the opening/closing means provided in the mold, to close the gap between the rim of the cavity-side opening and the outer periphery of the base portions of the protrusion part. Accordingly, it is possible to prevent entry of pre-expanded beads into the gap when the pre-expanded beads are packed or the packed pre-expanded beads are thermally fused, thereby preventing reliably the occurrence of burrs around the protrusion part of the molded article. In particular, in the case of providing, as the protrusion part, a female hook such as U- or V-shaped having a pair of leg portions and a coupling portion for coupling the leading ends of the leg portions, if a molded article is molded with conventional mold without an opening/closing means, a large gap is generated between the base end portions of the leg portions in the cavity-side opening of the accommodation concave part, and burrs occur between the leg portions. However, the present invention can prevent reliably the occurrence of such burrs.

In yet other embodiments for manufacturing an in-mold foaming molded article according to the present invention is a method for manufacturing an in-mold foaming molded article in which an insert member is integrally molded with a foaming molded body, the insert member including an embedded part to be embedded into the foaming molded body formed from a polyolefin-based foaming resin and a protrusion part protruding from the foaming molded body toward the outside, wherein a mold for in-mold foam molding to be used includes an accommodation concave part capable of accommodating the protrusion part, and an opening/closing means having an opening/closing part capable of opening and closing a cavity-side opening in conjunction with insertion and extraction of the protrusion part into and from the accommodation concave part, so as to close the cavity-side opening in a state that the protrusion part is inserted into the accommodation concave part, and the method includes: a step of inserting the protrusion part into the accommodation concave part in the mold and closing the cavity-side opening in the accommodation concave part by the opening/closing part in conjunction with insertion of the protrusion part, to set the insert member in the mold; a step of closing the mold to mold the foaming molded body such that the insert member is integrally molded; and a step of, at the time of releasing the foaming molded body from the mold, opening the opening/closing part in the opening/closing means in conjunction with extraction of the protrusion part from the accommodation concave part and extracting the protrusion part from the accommodation concave part to release the molded article from the mold.

Accordingly, the opening/closing means similar to that in the mold for in-mold foam molding of polyolefin-based resin is used to obtain the same advantageous effects as those of the mold.

The opening/closing part may be provided with an insertion-side opening operation part that abuts on a leading end of the protrusion part and operates the opening/closing part to the opening position, and the insertion-side opening operation part forms a projection extending between base portions of leg portions on a surface of the foaming molded body. In this case, the protrusion part can be smoothly inserted into the accommodation concave part by the insertion-side opening operation part provided in the opening/closing part, thereby improving workability of attaching the insert member to the mold. In addition, although the manufactured in-mold foaming molded article has the projection between the base portions of the leg portions, the projection is formed by the insertion-side operation part and has a shape with a beautiful appearance. Unlike burrs, the projection does not deteriorate the appearance of the manufactured in-mold foaming molded article or fall off the in-mold foaming molded article.

A in-mold foaming molded article according to one or more embodiments of the present invention is an in-mold foaming molded article in which an insert member is integrally molded with a foaming molded body, the insert member including an embedded part to be embedded into the foaming molded body formed from a polyolefin-based foaming resin and a protrusion part protruding from the foaming molded body toward the outside, wherein the insert member is integrally molded with the foaming molded body, in a state that the protrusion part is inserted into an accommodation concave part in a mold for in-mold foam molding and a cavity-side opening in the accommodation concave part is closed by an opening/closing part in an opening/closing means provided in the mold.

The in-mold foaming molded article is manufactured by molding the insert member integrally with the foaming molded body in a state that the cavity-side opening in the accommodation concave part is closed by the opening/closing part in the opening/closing means provided in the mold. Accordingly, it is possible to obtain the same advantageous effects as those of the first manufacturing method.

In the in-mold foaming molded article, the protrusion part may be composed of a female hook having a pair of leg portions and a coupling portion for coupling the leg portions, and a projection extending between base portions of the leg portions is formed by the opening/closing part on a surface of the foaming molded body. In this case, although the manufactured in-mold foaming molded article has the projection between the base portions of the leg portions, the projection is formed by the opening/closing part and has a shape with a beautiful appearance. Accordingly, it is possible to prevent effectively the problems with conventional in-mold foaming molded articles in that burrs are formed around the leg portions and deteriorate the appearance of the in-mold foaming molded article and the burrs fall off the in-mold foaming molded article.

In another embodiment of the present invention is an in-mold foaming molded article in which an insert member is integrally molded with the foaming molded body, the insert member including an embedded part to be embedded into the foaming molded body formed from a polyolefin-based foaming resin and a protrusion part protruding from the foaming molded body toward the outside, wherein the protrusion part is composed of a female hook having a pair of leg portions and a coupling portion for coupling the leg portions, and a projection extending between base portions of the leg portions is formed on a surface of the foaming molded body.

The projection having uniform and beautiful appearance is continuously formed between the base portions of the leg portions of the female hook on the surface of the foaming molded body. Accordingly, it is possible to prevent effectively the problems with conventional in-mold foaming molded articles in that burrs are formed around the leg portions and deteriorate the appearance of the in-mold foaming molded article and the burrs fall off the in-mold foaming molded article.

The projection may be formed in a raised shape with an angle-shaped cross section.

In addition, the in-mold foaming molded body may be an automobile seat core material including as the protrusion part a female hook for fixation to a vehicle.

According to the mold for in-mold foam molding of polyolefin-based resin and the method for manufacturing an in-mold foaming molded article according to one or more embodiments of the present invention, when the protrusion part of the insert member is inserted into the accommodation concave part to set the insert member in the cavity, the cavity-side opening is closed by the opening/closing part in the opening/closing means in conjunction with the insertion of the protrusion part, to close the gap between the rim of the cavity-side opening and the outer periphery of the base portion of the protrusion part. Accordingly, after the insert member is set in the mold and the mold is closed, when the pre-expanded beads are packed or the packed pre-expanded beads are thermally fused, it is possible to prevent entry of pre-expanded beads into the gap, and to prevent reliably the occurrence of burrs around the protrusion part of the molded article. In particular, in the case of providing, as the protrusion part, a female hook such as U- or V-shaped having a pair of leg portions and a coupling portion for coupling the leading ends of the leg portions, if a molded article is molded with conventional mold without an opening/closing means, a large gap is generated between the base end portions of the leg portions in the cavity-side opening of the accommodation concave part, and burrs occur between the leg portions. However, one or more embodiments disclosed herein can prevent reliably the occurrence of such burrs. In addition, when the protrusion part is operated in the direction of extraction by releasing the molded article from the mold, the cavity-side opening is opened by the opening/closing part in the opening/closing means in conjunction with the operation of the protrusion part, to allow the protrusion part to be extracted from the accommodation concave part without reduction in workability of mold release. According to the mold and the manufacturing method, as described above, the cavity-side opening in the accommodation concave part is opened and closed by the opening/closing means in conjunction with insertion and extraction of the protrusion part into and from the accommodation concave part. This makes it possible to prevent the occurrence of burrs around the protrusion part without reduction in workability of molding, and to eliminate the need for burr trimming, thereby achieving productivity improvement and labor cost cutting.

Accordingly, an in-mold foaming molded article, in a state that the protrusion part of the insert member is inserted into the accommodation concave part of the mold for in-mold foam molding and the insert member is attached to the mold, the cavity-side opening in the accommodation concave part is closed by the opening/closing part in the opening/closing means provided in the mold, to close the gap between the rim of the cavity-opening and the outer periphery of the base portions of the protrusion part. Accordingly, it is possible to prevent entry of pre-expanded beads into the gap when the pre-expanded beads are packed or the packed pre-expanded beads are thermally fused, thereby preventing reliably the occurrence of burrs around the protrusion part of the molded article. In particular, in the case of providing, as the protrusion part, a female hook such as U- or V-shaped having a pair of leg portions and a coupling portion for coupling the leading ends of the leg portions, if a molded article is molded with conventional mold without an opening/closing means, a large gap is generated between the base end portions of the leg portions in the cavity-side opening of the accommodation concave part, and burrs occur between the leg portions. However, one or more embodiments can prevent reliably the occurrence of such burrs.

The in-mold foaming molded article is manufactured by molding the insert member integrally with the foaming molded body in a state that the cavity-side opening in the accommodation concave part is closed by the opening/closing part in the opening/closing means provided in the mold. Accordingly, it is possible to obtain the same advantageous effects.

Accordingly, the projection having uniform and beautiful appearance is continuously formed between the base portions of the leg portions of the female hook on the surface of the foaming molded body. Accordingly, it is possible to prevent effectively the problems with conventional in-mold foaming molded articles in that burrs are form around the leg portions and deteriorate the appearance of the in-mold foaming molded article and the burrs fall off the in-mold foaming molded article.

BRIEF DESCRIPTION OF THE DRAWINGS

FIG. 6A is a front view of an insert holding means and FIG. 6B is a front view of the insert holding means without a lid member.

FIG. 7A is a cross-sectional view of FIG. 6A taken along line VIIa-VIIa and FIG. 7B is a cross-sectional view of FIG. 6B taken along line VIIb-VIIb.

FIG. 9A is a transverse cross-sectional view of the insert holding means in which a fastening part is passing through the opening/closing part and FIG. 9B is a transverse cross-sectional view of the insert holding means with the fastening part inserted.

FIG. 11A is a transverse cross-sectional view of an insert holding means including another opening/closing means in which a fastening part is passing through an opening/closing part and FIG. 11B is a transverse cross-sectional view of the insert holding means with the fastening part inserted.

FIG. 12A is a transverse cross-sectional view of an insert holding means including another opening/closing means in which a fastening part is passing through an opening/closing part and FIG. 12B is a transverse cross-sectional view of the insert holding means with the fastening part inserted.

DESCRIPTION OF EMBODIMENTS

One or more embodiments of the present invention will be described below with reference to the drawings.

First, a configuration of a molded article capable of being molded by mold according to one or more embodiments of the present invention will be described.
(Molded Article)

Figure 1:
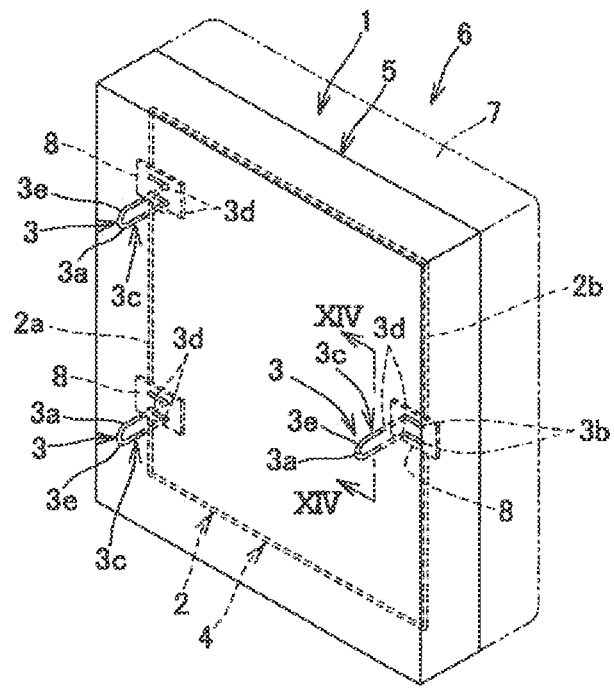
FIG. 1 is a perspective view of a molded article placed in portrait orientation.
Figure 2:
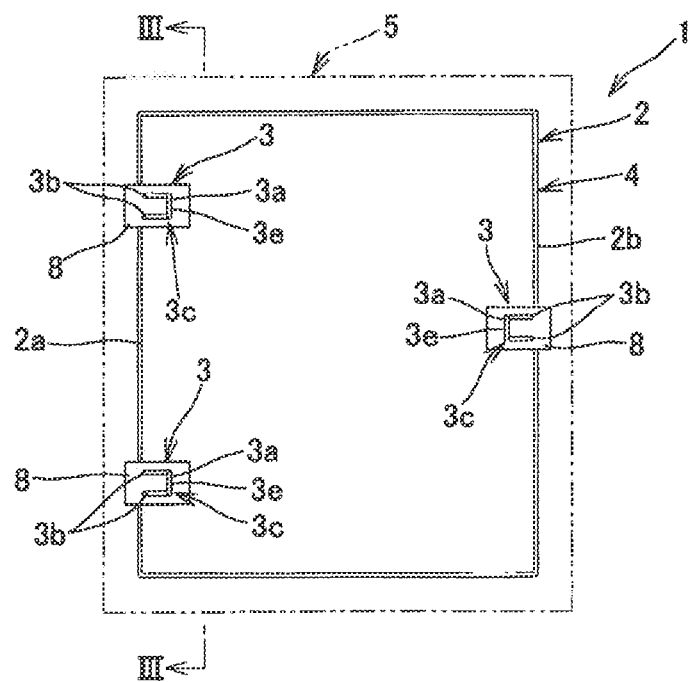
FIG. 2 is a bottom view of an insert member.
Figure 3:
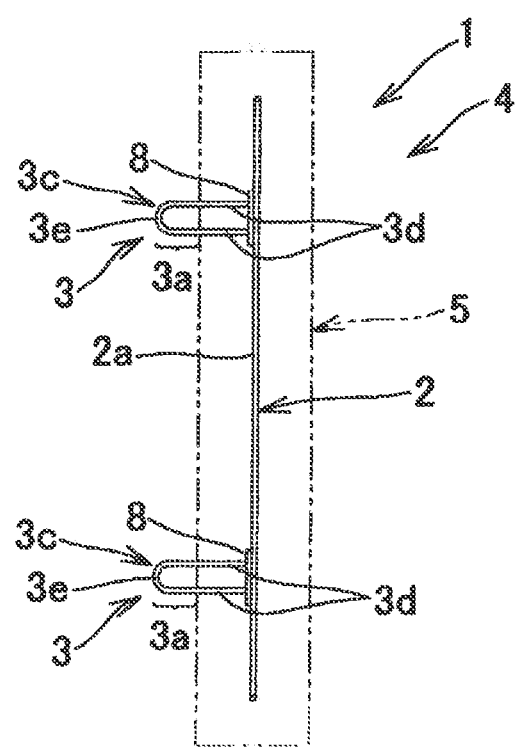
FIG. 3 is a cross-sectional view of FIG. 2 taken along line III-III.

As illustrated in FIGS. 1 to 3, a molded article 1 includes an insert member 4 having an anchor material 2 and a plurality of fastening members 3 added to the anchor material 2 and a foaming molded body 5 that is formed from a polyolefin-based foaming resin and molded integrally with the insert member 4. The insert member 4 is integrally molded and embedded in the foaming molded body 5 by in-mold foam molding such that at least protrusion parts 3a at leading ends of the fastening members 3 protrude from the foaming molded body 5 toward the outside in a mold opening/closing direction at the time of molding. FIG. 1 is a perspective view of a vehicle seat core material as the molded article 1 placed in portrait orientation. The vehicle seat 6 is manufactured by molding a molded body 7 of polyurethane on the upper side of the foaming molded body 5 in the molded article 1 as shown by virtual lines and covering the same with a cover member. However, the mold makes it possible to produce a molded article 1 of any configuration other than the vehicle seat core material, such as a vehicle bumper core material, an automobile interior member including a headrest core material, and others, as far as the molded article 1 is configured such that the insert member 4 with the protrusion parts 3a is molded integrally with the foaming molded body 5. In the molded article 1, the part other than the protrusion parts 3a of the insert member 4 corresponds to the embedded part.

The anchor material 2 is formed by folding a metallic wire made of iron or stainless steel into a rectangular frame and welding its both ends. A pair of attachment plates 8 is fixed with spacing therebetween to one anchor side part 2a of a pair of parallel anchor side parts 2a and 2b of the anchor material 2, and one attachment plate 8 is fixed to the other anchor side part 2b. These three attachment plates 8 are embedded in the foaming molded body 5. The fastening members 3 are attached to the attachment plates 8 and protrude outward (toward the front side in the paper plane of FIG. 2 and the lower side in the state of being assembled to the vehicle body).

The arrangement positions and numbers of the attachment plates 8 and the fastening members 3 can be arbitrarily set. In addition, the anchor material 2 can be arbitrarily configured as far as it can fix the fastening members 3 to the foaming molded body 5. For example, the anchor material 2 can be formed by shaping a narrow pipe-like or bar-like member of a metallic material or a synthetic resin material in a frame, a linear fashion, or a reticular pattern according to the shape of the seat, or can be formed by a regular square or rectangular plate-like member of a metallic material or a synthetic resin material, for example. Alternatively, the anchor material 2 may not be provided but the attachment plates 8 may be used as anchor materials instead. Further, although the fastening members 3 are fixed to the anchor material 2 via the attachment plates 8, the fastening members 3 may be fixed directly to the anchor material 2.

Each of the fastening members 3 has a fixing part 3b to the attachment plate 8 and a fastening part 3c protruding outward from the fixing part 3b. The fastening part 3c is composed of an approximately U-shaped female hook having a pair of leg portions 3d with base ends coupled to the fixing part 3b and a coupling portion 3e coupling the leading ends of the leg portions 3d. The base end of the fastening part 3c and the fixing part 3b are embedded in the foaming molded body 5. A protrusion part 3a is formed at the leading end of the fastening part 3c and protrudes from the foaming molded body 5 toward the outside in the mold opening/closing direction at the time of molding. The molded article 1 is assembled into the vehicle body by coupling the protrusion parts 3a of the three fastening members 3 to the members of the vehicle body.

Figure 4:
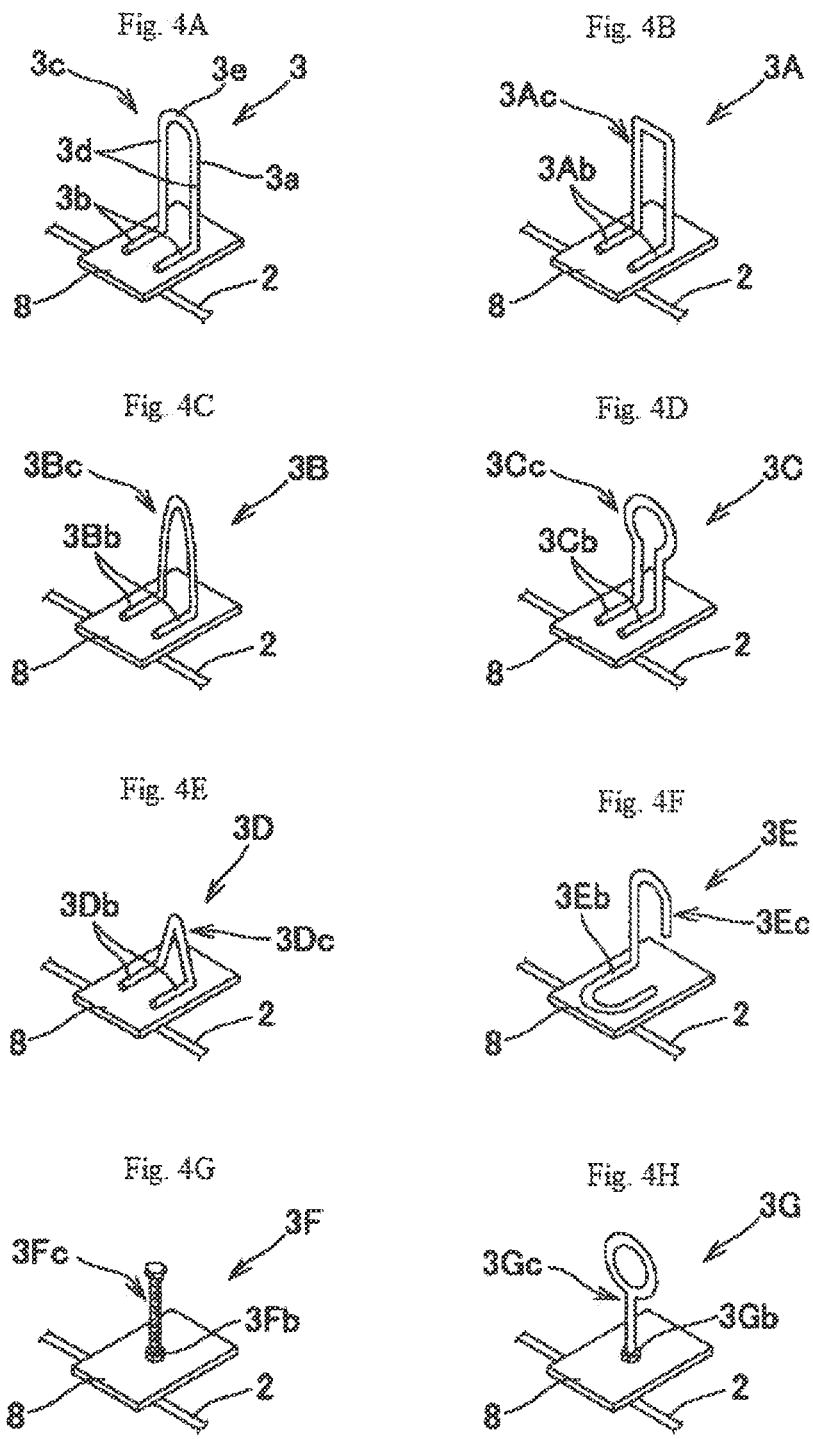
FIGS. 4A to 4H are perspective views of fastening members.

The number and arrangement positions of the fastening members 3 can be arbitrarily set according to the configuration of the vehicle. In addition, the protrusion parts 3a of the fastening members 3 protruding from the foaming molded body 5 toward the outside in the mold opening/closing direction at the time of molding are used to fix the molded article 1 and coupling another object to the molded article 1. Each of the protrusion parts 3a can have an arbitrary shape as far as it is configured such that the transverse cross-sectional area of the base end is smaller than the projection area in the mold opening/closing direction. Specifically, the fastening part 3c can be composed of a hook part including a female hook such as U- or V-shaped, a male hook such as J- or L-shaped, and the like, or can be composed of a bolt with a head arranged on the leading end, an eyebolt with an eye on the leading end, or the like. More specifically, the fastening member 3 may have the fixing part 3b to the attachment plate 8 and the fastening part 3c composed of a U-shaped female hook as the fastening member 3 illustrated in FIG. 4A, or may have a fixing part 3Ab to the attachment plate 8 and a fastening part 3Ac composed of a rectangular female hook as a fastening member 3A illustrated in FIG. 4B, or may have a fixing part 3Bb to the attachment plate 8 and a fastening part 3Bc composed of a semi-elliptic female hook as a fastening member 3B illustrated in FIG. 4C, or may have a fixing part 3Cb to the attachment plate 8 and a fastening part 3Cc composed of a keyhole-shaped female hook as a fastening member 3C illustrated in FIG. 4D, or may have a fixing part 3Db to the attachment plate 8 and a fastening part 3Dc composed of a V-shaped female hook as a fastening member 3D illustrated in FIG. 4E. In addition, the fastening member 3 may have a U-shaped fixing part 3Eb to the attachment plate 8 and a fastening part 3Ec composed of a J-shaped male hook as a fastening member 3E illustrated in FIG. 4F, or may have a fixing part 3Fb composed of a nut member fixed to the attachment plate 8 and a fastening part 3Fc composed of a bolt member with a leading end screwed into the nut member as a fastening member 3F illustrated in FIG. 4G or may have a fixing part 3Gb composed of a nut member fixed to the attachment plate 8 and a fastening part 3Gc composed of an eye bolt with a leading end screwed into the nut member as a fastening member 3G illustrated in FIG. 4H.

Figure 14A:
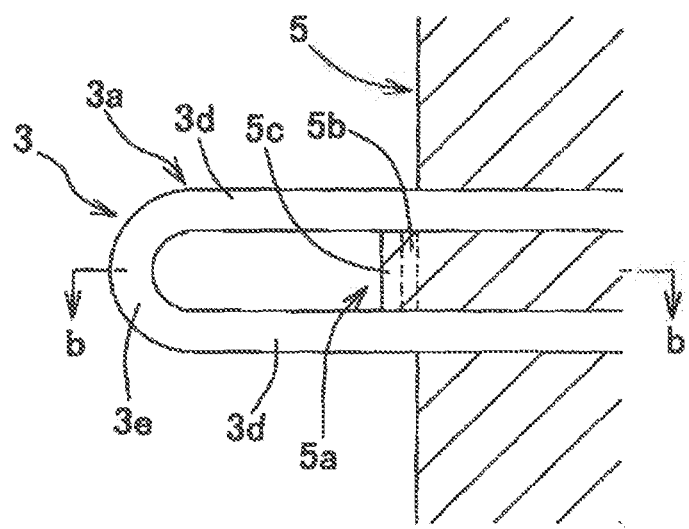
FIG. 14A is a cross-sectional view of FIG. 1 taken along line XIV-XIV and FIG. 14B is a cross-sectional view of FIG. 14A taken along line b-b.
Figure 14B:
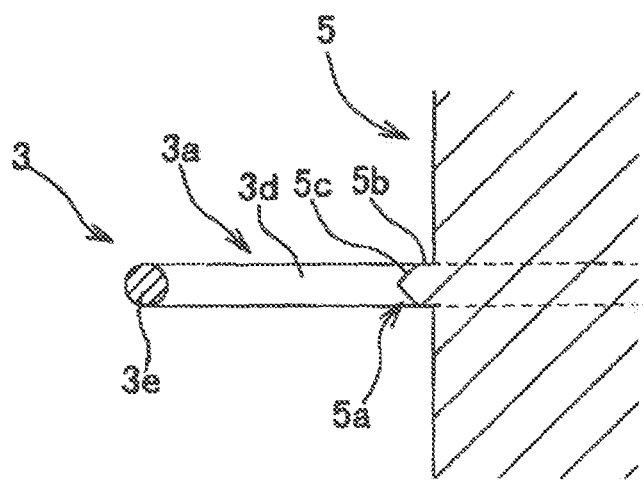

A projection 5a is integrally formed with the foaming molded body 5 and projects from the surface of the foaming molded body 5 toward the outside in a projected plane of the protrusion part 3a of the fastening member 3 on the surface of the foaming molded body 5 in the mold opening/closing direction as illustrated in FIG. 14. The projection 5a includes a foundation portion 5b formed by the inner surface of an insertion hole 35 in a mold apparatus for molding the molded article 1 and a linear rising portion 5c with an angle-shaped cross section formed by insertion opening operation surfaces 41c and 41Cc of opening/closing means 40 and 41A to 41C as described later. The projection 5a is formed by the mold apparatus to have a continuously uniform and beautiful appearance between the base portions of the leg portions 3d. However, the foundation portion 5b of the projection 5a is shaped in accordance with the inner shape of the insertion hole 35 into which the protrusion part 3a is insertable, and the rising portion 5c is shaped in an approximately liner fashion with a cross section adapted to the shapes of the insertion opening operation surfaces 41c and 41Cc.

The foaming molded body 5 is formed in a thick rectangular plate shape adapted to a vehicle seat. However, the size and shape of the foaming molded body 5 can be decided as appropriate depending on the size and shape of the vehicle seat. The polyolefin-based resin constituting the foaming molded body 5 is a polymer containing 75 weight % or more of olefin-based monomer.

(Polyolefin-Based Resin)

Specific examples of olefin-based monomers are α-olefins with carbon numbers of 2 to 12 such as ethylene, propylene, butene-1, isobutene, pentene-1, 3-methyl-butene1, hexene-1, 4-methyl-pentene-1, 3,4-dimethyl-butene-1, heptene-1, 3-methyl-hexene-1, octene-1, and decene-1. They may be used singly or in combination of two or more of them.

In addition, other specific examples of monomers copolymerizable with the olefin-based monomer are cyclic olefins such as cyclopentene, norbornene, 1,4,5,8-dimethano-1,2,3,4,4a,8,8a,6-octahydronaphthalene, and dienes such as 5-methylene-2-norbornene, 5-ethylidene-2-norbornene, 1,4-hexadiene, methyl-1,4-hexadiene, 7-methyl-1,6-octadiene. They may be used singly or in combination of two or more of them.

Specific examples of polyolefin-based resins are polyethylene-based resins with ethylene as a main component such as a high-density polyethylene, a medium-density polyethylene, a low-density polyethylene, and a linear low-density polyethylene, and polypropylene-based resins with propylene as a main component. These polyolefin-based resins may be used singly or in combination of two or more of them.

There is no particular limitation on the polypropylene-based resin as far as it contains propylene as a main component of the monomer. For example, the polypropylene-based resin may be a propylene homopolymer, an α-olefin-propylene random copolymer, an α-olefin-propylene block copolymer, or the like. They may be used singly or in combination of two or more of them.

In one or more embodiments, polypropylene-based resins containing α-olefin that is ethylene as a comonomer component may be used for in-mold foam molding because of their availability and moldability. There is no particular limitation on the polypropylene-based resin as far as it contains propylene as a main component of monomer. For example, the polypropylene-based resin may be a propylene homopolymer, an olefin-propylene random copolymer, an olefin-propylene block copolymer, or the like. They may be used singly or in combination of two or more of them.

The polyethylene-based resin may be an ethylene homopolymer, an ethylene-α-olefin random copolymer, an ethylene-α-olefin block copolymer, a low-density polyethylene, a high-density polyethylene, a linear low-density polyethylene, or the like. The α-olefins here may α-olefins with carbon numbers of 3 to 15 and the like. They may be used singly or in combination of two or more of them. Among these polyethylene-based resins, an ethylene-α-olefin block copolymer with a content of 1 to 10 weight % of comonomer other than ethylene or a linear low-density polyethylene exhibits excellent foaming property and is suitably used for in-mold foam molding.

The polyolefin-based resin can be used as a polyolefin-based resin composition mixed as appropriate with a cell nucleating agent such as talc, stabilizers such as an antioxidant, a metal deactivator, a phosphorus-based processing stabilizer, an ultraviolet absorber, an ultraviolet stabilizer, a fluorescent brightener, and a metallic soap, or additives such as a cross-linker, a chain transfer agent, a lubricant, a plasticizer, a filler, a toughening agent, an inorganic pigment, an organic pigment, a conductive modifier, a flame retardant modifier, a surfactant-type or high-molecular antistatic agent.

The polyolefin-based resin composition is generally formed to be easily used for pre-expansion by melting and mixing in advance a polyolefin-based resin as necessary with the additives described above by the use of an extruder, a kneader, a Banbury mixer, a roll, or the like, and then molding the same into polyolefin-based resin particles in a desired shape such as a circular cylinder, an ellipse, a sphere, a cube, a rectangular parallelepiped, or the like.

There is no particular limitation on the method for manufacturing the polyolefin-based resin pre-expanded beads. However, decompression foaming, may be used, by which polyolefin-based resin particles are dispersed with a dispersant and the like in a dispersion medium in the presence of a foaming agent in an airtight container, they are heated under pressure to a predetermined foaming temperature and the foaming agent is impregnated in the resin particles, and then the dispersed matter in the airtight container is released and foamed to a low-pressure area with the temperature and the pressure in the container kept at the constant levels.

The heating temperature in the airtight container may fall within the range of the melting point of the polyolefin-based resin particles −25° C. to the melting point of the polyolefin-based resin particles +25° C., further may fall within the range of the melting point of the polyolefin-based resin particles −15° C. to the melting point of the polyolefin-based resin particles +15° C. The polyolefin-based resin particles are heated to the foregoing temperature and pressurized to impregnate the foaming agent in the polyolefin-based resin particles, and one end of the airtight container is opened to release the polyolefin-based resin particles into an atmosphere under lower pressure than the airtight container, thereby manufacturing the polyolefin-based resin pre-expanded beads.

There is no particular limitation on the foaming agent for manufacturing the polyolefin-based resin pre-expanded beads. For example, the foaming agent can be an aliphatic hydrocarbon such as propane, isobutane, normal butane, isopentane, or normal pentane; inorganic gas such as air, nitrogen, or carbon dioxide; water; or a mixture of these.

(Mold Apparatus)

Next, an example of configuration of a mold apparatus will be described.

Figure 5:
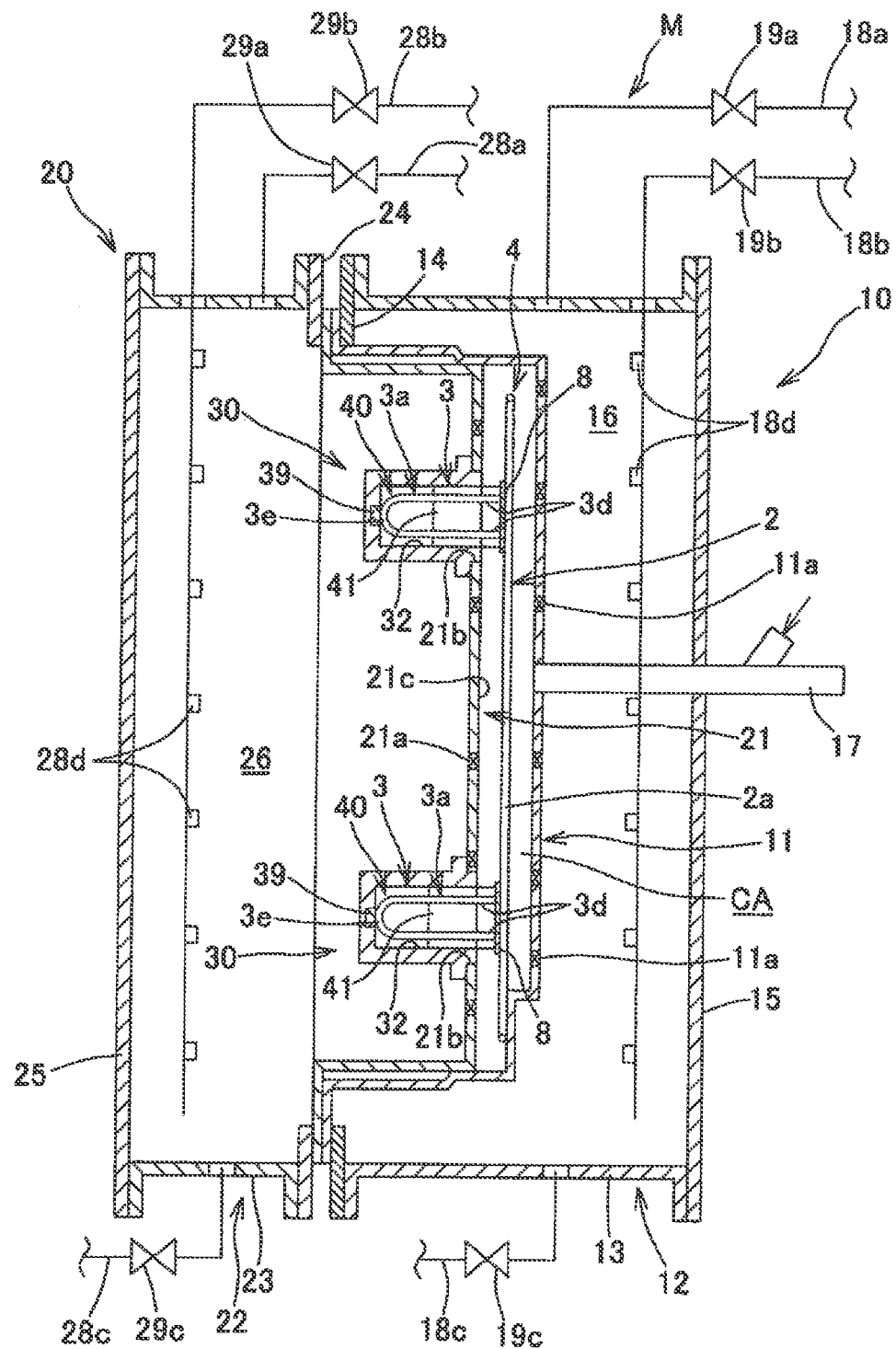
FIG. 5 is a vertical cross-sectional view of an in-mold foam molding apparatus.
Figure 8:
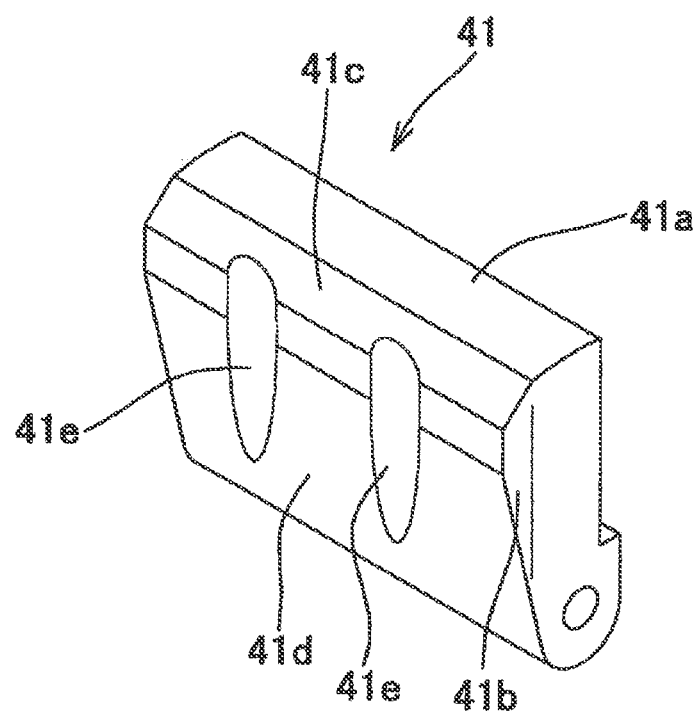
FIG. 8 is a perspective view of an opening/closing part.

As illustrated in FIG. 5, a mold apparatus M for in-mold foam molding includes a concave mold unit 10 having a concave mold 11 and a concave mold housing 12 holding the concave mold 11, a convex mold unit 20 having a convex mold 21 and a convex mold housing 22 holding the convex mold 21, and three insert holding means 30 fixing and holding an insert member 4 between the concave mold unit 10 and the convex mold unit 20. The insert member 4 is fixed and held in the convex mold unit 20 by the insert holding means 30, the concave mold unit 10 and the convex mold unit 20 are combined, and the embedded part of the insert member 4 is fixed and held in a cavity CA formed by the concave mold 11 and the convex mold 21 as the mold. In this state, pre-expanded beads are packed in the cavity CA, and the pre-expanded beads in the cavity CA are heated and expanding-fused to obtain the molded article 1 in which the insert member 4 is integrally molded and embedded in the foaming molded body 5.

The mold including the concave mold 11 and the convex mold 21 is composed of a casting of low specific heat and high thermal conductivity, for example, an aluminum alloy so that the molded article 1 can be smoothly heated and cooled. The both housings 12 and 22 are composed of an iron-based metal to decrease manufacturing costs for the mold apparatus M and assure sufficient strength and stiffness.

The concave mold housing 12 has a rectangular cylindrical concave mold frame 13, the concave mold 11 that is fixed via a center plate 14 to the concave mold frame 13 to close the opening on the front side (the juncture side of the mold) of the concave mold frame 13 and a concave mold back plate 15 that closes the opening on the back side of the concave mold frame 13. The concave mold housing 12 has therein a concave mold chamber 16 on the back side of the concave mold 11.

A steam supply pipe 18a, a cooling water supply pipe 18b, and a drain pipe 18c are connected to the concave mold unit 10 and are opened to the concave mold chamber 16. Control valves 19a to 19c are interposed in the middle parts of these pipes 18a to 18c and are operated to supply steam into the concave mold chamber 16 to heat and expand the pre-expanded beads, jet cooling water from nozzles 18d onto the back side of the concave mold 11 to cool the molded article 1, and discharge an unnecessary drain out of the concave mold chamber 16. The concave mold 11 has a large number of vent holes 11a through which steam is supplied from the concave mold chamber 16 into the cavity CA. A filling gun 17 is fixed to the concave mold back plate 15. The leading end of the filling gun 17 is opened to the cavity CA through the concave mold 11. The pre-expanded beads are supplied from the filling gun 17 into the cavity CA and packed in the cavity CA. Although not illustrated, a material hopper for packing the pre-expanded beads into the cavity CA, a material hose connecting the material hopper and the filling gun, and the like are arranged as in a general mold.

The convex mold housing 22 has a rectangular cylindrical convex mold frame 23, the convex mold 21 that is fixed via a center plate 24 to the convex mold frame 23 to close the opening on the front side (juncture side of the mold) of the convex mold frame 23, and a convex mold back plate 25 to close the opening on the back side of the convex mold frame 23. The convex mold housing 22 has therein a convex mold chamber 26 (equivalent to the steam chamber) on the back side of the convex mold 21.

A steam supply pipe 28a, a cooling water supply pipe 28b, and a drain pipe 28c are connected to the convex mold unit 20 and are opened to the convex mold chamber 26. Control valves 29a to 29c are interposed in the middle parts of these pipes 28a to 28c and are operated to supply steam into the convex mold chamber 26 to heat and expand the pre-expanded beads, jet cooling water from nozzles 28d onto the back side of the convex mold 21 to cool the molded article 1, and discharge an unnecessary drain out of the convex mold chamber 26. The convex mold 21 has a large number of vent holes 21a through which steam is supplied from the convex mold chamber 26 into the cavity CA.

One or more embodiments of the present invention may be characterized by the insert holding means 30, and the mold apparatus M except for the insert holding means 30 can be configured in any manner other than that illustrated in FIG. 5. For example, the concave mold 11 may have the filling gun 17, or the concave mold 11 or the convex mold 21 may have an ejector pin capable of protruding toward the inside of the cavity CA.

(Insert Holding Means)

The insert holding means 30 each include a casing 31, an opening/closing means 40 attached to the inside of the casing 31, a heat-resistant permanent magnet 39 in a bottom surface part 31a of the casing 31. The insert holding means 30 are assembled into attachment holes 21b provided in the convex mold 21 in correspondence with the arrangement position of the insert member 4. However, depending on the configuration of the molded article 1, the concave mold 11 may be provided with attachment holes and the insert holding means 30 may be assembled into these holes. In addition, the permanent magnets 39 are provided but may be omitted.

The casing 31 includes a main body 33 having an accommodation concave part 32 capable of accommodating the protrusion part 3a of the fastening member 3 and a lid member 34 attached to the main body 33 to close the opening in the accommodation concave part 32. The casing 31 is assembled into the attachment hole 21b with the lid member 34 on the cavity CA side and the casing 31 on the convex mold chamber 26 side.

A molding surface 21c on the front side of the lid member 34 facing the cavity CA is flush with a molding surface 21c of the convex mold 21. The lid member 34 has in the center of the front surface a narrow insertion hole 35 elongated in a vertical direction in which the protrusion part 3a of the fastening part 3c can be inserted almost without gap.

The heat-resistant permanent magnets 39 are assembled into the bottom surface parts 31a of the casings 31. Accordingly, when the protrusion parts 3a of the three fastening members 3 of the insert member 4 are inserted into the insertion holes 35 of the three insert holding means 30 to attach the insert member 4 to the convex mold 21, the leading ends of the fastening parts 3c are attracted and held by the permanent magnets 39, and the insert member 4 is fixed and held in the appropriate position in the convex mold 21. However, the main bodies 33 may be omitted and the casings 31 may be recessed on the cavity CA side to form accommodation concave parts integrally with the convex mold 21 so that the lid member 34 can close the concave parts on the cavity CA side.

The opening/closing means 40 may be arbitrarily configured as far as, while the protrusion part 3a is inserted into the insertion hole 35, the opening/closing means 40 prevents the formation of a gap in the insertion hole 35 into which the pre-expanded beads can enter, thereby preventing the occurrence of burrs caused by the entry of the pre-expanded beads into the gap. The gap may be completely eliminated, but when the occurrence of unremarkable burrs is allowed, a slight gap may be formed in the insertion hole 35 into which the protrusion part 3a is inserted as far as the pre-expanded beads cannot pass through the gap.

The opening/closing means 40 is accommodated in the accommodation concave part 32 of the main body part 33. The opening/closing means 40 includes a pair of opening/closing parts 41 that are arranged on both sides of the protrusion part 3a of the insert member 4 when the protrusion part 3a is inserted into the insert holding means 30, a pair of support shafts 42 that support the pair of opening/closing parts 41 to be capable of swinging between an opening position illustrated in FIG. 9A and a closing position illustrated in FIG. 9B, and a pair of biasing means 43 that bias constantly the pair of opening/closing parts 41 to the closing position. The insert holding means 30 can be formed from an arbitrary material such as aluminum, brass, stainless steel, or a heat-resistant synthetic resin. However, from the viewpoints of strength, abrasion resistance, thermal conductivity, manufacturing cost for components, and the like, the casing 31 may be formed from brass or aluminum material, the opening/closing parts 41 are formed from brass or aluminum material, and the support shafts 42 are formed from high-strength and high-corrosive resistant stainless steel or brass.

The pair of support shafts 42 is vertically installed over the main body 33 in approximately parallel to each other with spacing therebetween on the side slightly deeper than the central portion of the accommodation concave part 32.

Each of the opening/closing parts 41 has a base end supported to be capable of swinging by the support shaft 42 and a leading end extended up to the lid member 34. The leading end of the opening/closing part 41 has a closing surface 41a that can close a vertical half part of the insertion hole 35 in the closing position. The closing surface 41a is formed as an arc surface centered on the support shaft 42. A pair of arc surfaces 34a is provided in recessed shapes centered on the support shafts 42 of the corresponding opening/closing parts 41 on the surface of the lid member 34 opposed to the closing surfaces 41a of the pair of opening/closing parts 41. The pair of opening/closing parts 41 can close the insertion hole 35 almost without gap by eliminating almost completely the gap between the closing surfaces 41a of the opening/closing parts 41 and the corresponding arc surfaces 34a of the lid member 34. The closing surfaces 41a may be brought into sliding contact with the lid member 34 without gap to prevent the occurrence of burrs as much as possible. However, the closing surfaces 41a may be separated from the lid member 34 with a gap to such a degree that there occurs no burr.

The opening/closing parts 41 have operation projections 41b at the leading ends of the opposed part with a height larger than the radius of the leg portion 3d of the protrusion part 3a. Each of the projections 41b has, at the leading end thereof, an extraction opening surface 41c (equivalent to the insertion-side opening operation part) having an inclination surface which abuts on the leading end of the protrusion part 3a and causes the opening/closing parts 41 to move to the opening position, when the protrusion part 3a is inserted into the accommodation concave part 32. Each of the projections 41b has, at the base end thereof, an extraction opening surface 41d (equivalent to the extraction-side opening operation part) having an inclined surface which abuts on the leading end of the protrusion part 3a and causes the opening/closing parts 41 to the opening position when the protrusion part 3a is extracted from the accommodation concave part 32.

The width of the opening/closing parts 41 is made wider than the length of the insertion hole 35. The pair of opening/closing parts 41 has a pair of semi-cylindrical fitting grooves 41e into which the pair of leg portions 3d of the protrusion part 3a is fit in the width-direction middle portions of the opposed parts. However, width W of the opening/closing parts 41 may be set to the same as the distance between the centers of the leg portions 3d, and the pair of opening/closing parts 41 may have a pair of ¼-cylindrical fitting grooves at the both width-direction ends of the opposed parts. In addition, when the occurrence of slight burrs is allowed, the width of the opening/closing parts 41 may be slightly smaller than the distance between the centers of the leg portions 3d.

The opposed parts of the opening/closing parts 41 may be formed in a trapezoidal shape, a home-base shape, a triangular shape, or a T shape in which the base end side is narrower as far as the opening/closing parts 41 each have the closing surface 41a, the insertion opening operation surface 41c, and the extraction opening operation surface 41d.

The biasing means 43 may be composed of compression coil springs as in the embodiment or extension coil springs or plate springs, or the like as far as they bias constantly the pair of opening/closing parts 41 to the closing position.

The bottom surface part 31a of the main body 33 or the bottom surface part 31a of the side wall has a beads discharge hole 44 opened to the convex mold chamber 26. The beads discharge hole 44 is sized to let the pre-expanded beads pass through. Accordingly, even though, in packing the pre-expanded beads into the cavity CA, some of them enter into the accommodation concave part 32, they can be discharged into the convex mold chamber 26 through the beads discharge hole 44. This prevents the occurrence of burrs caused by the entry of the pre-expanded beads into the accommodation concave part 32 and also prevents defective operation of the opening/closing means 40 due to the residual pre-expanded beads in the accommodation concave part 32. The appropriate size of the beads discharge hole 44 varies depending on the size of the used pre-expanded beads. However, since the maximum size of the generally used pre-expanded beads is about 5 mm, the size of the beads discharge hole 44 may be set to 5 mm or more and 10 mm or less to make the insert holding means 30 small in size.

(Method for Manufacturing an in-Mold Foaming Molded Article)

To manufacture the molded article 1 by the use of the mold apparatus M, first, at a setting step, while the concave mold 11 and the convex mold 21 are opened, the three protrusion parts 3a of the insert member 4 are inserted into the insertion holes 35 of the insert holding means 30 to set the insert member 4 in the mold apparatus M. At this time, the insertion opening operation surfaces 41c of the pair of opening/closing parts 41 in the opening/closing means 40 are pushed by the leading ends of the protrusion parts 3a and the pair of the opening/closing parts 41 turn to the opening position on the biasing force of the biasing means 43 as illustrated in FIG. 9A. After that, when the coupling portions 3e of the protrusion parts 3a pass through the opening/closing parts 41, the opening/closing parts 41 turn to the closing position by the biasing force of the biasing means 43 as illustrated in FIG. 9B, and the fitting grooves 41e of the opening/closing parts 41 fit onto the leg portions 3d of the protrusion parts 3a almost without gap. Accordingly, the insertion holes 35 are entirely closed almost without gap by the closing surfaces 41a on the leading ends of the opening/closing parts 41, and the leading ends of the protrusion parts 3a are attracted and held by the permanent magnets 39, whereby the insert member 4 is positioned and held in the convex mold 21 at three points.

Next, at a molding step, while the convex mold 21 and the concave mold 11 are slightly opened to such a degree that pre-expanded beads do not run out of the cavity, polyolefin-based resin pre-expanded beads formed by increasing air pressure up to 0.15 Mpa (G) in pre-expanded beads at a pre-processing stage are packed into the cavity CA. Then, at a steam-heating step, the concave mold chamber 16 and the convex mold chamber 26 are alternately ventilated with water steam, for example. The steam pressure is increased to about 0.1 Mpa (G) for the polyethylene-based resin or about 0.2 to 0.4 Mpa (G) for the polypropylene-based resin at the thermal fusing stage, and the steam pressure is kept for three to 30 seconds to expand and fuse thermally the pre-expanded beads, thereby molding the foaming molded body 5.

To enhance the expanding power of the pre-expanded beads, an internal pressure providing method is taken here as an example to increase the air pressure in advance in the pre-expanded beads. However, the provision of internal pressure is not necessary for the pre-expanded beads with sufficient expanding power, or the pre-expanded beads may be given expanding power by another method.

After the pre-expanded beads are thermally expanded and fused as described above, cooling water is jet onto the concave mold 11 and the convex mold 21 from the back side to cool the foaming molded body 5. Then, at a mold release step, the concave mold 11 and the convex mold 21 are opened to release the molded article 1 from the convex mold 21. In addition, when the molded article 1 is operated in the direction of mold release to release the molded article 1 from the convex mold 21, the coupling portions 3e of the protrusion parts 3a abut on the extraction opening operation surfaces 41d of the opening/closing parts 41 to turn the opening/closing parts 41 to the opening position, thereby allowing the protrusion parts 3a to be extracted from the accommodation concave parts 32. In addition, when the protrusion parts 3a are extracted from the accommodation concave parts 32, the opening/closing parts 41 return to the closing position by the biasing force of the biasing means 43.

As described above, when the protrusion parts 3a of the insert member 4 are inserted into the accommodation concave parts 32 to set the insert member 4 in the cavity CA, the cavity CA-side openings are closed by the opening/closing parts 41 of the opening/closing means 40 in conjunction with the insertion to close the gaps between the rims of the cavity CA-side openings and the outer peripheries of the base portions of the protrusion parts 3a. This prevents the entry of the pre-expanded beads into the gaps, thereby preventing reliably the occurrence of burrs around the protrusion parts 3a of the molded article 1. In addition, instead of burrs around the protrusion parts 3a, the projections 5a are continuously formed between the base portions of the leg portions 3d of the respective protrusion parts 3c on the surface of the foaming molded body 5 by the insertion holes 35 and the insertion opening operation surface 41c of the opening/closing means 40, as illustrated in FIG. 14. Here, each of the projection 5a has a beautiful appearance, and includes the foundation portion 5b and the rising portion 5c. Accordingly, it is possible to prevent effectively the problems with conventional in-mold foaming molded articles in that burrs occur around the leg portions and deteriorate the appearance of the in-mold foaming molded article and the burrs fall off the in-mold foaming molded article. Further, according to the mold, the cavity CA-side openings in the accommodation concave parts 32 are opened and closed by the opening/closing means 40 in conjunction with the insertion and extraction of the protrusion parts 3a into and from the accommodation concave parts 32. This makes it possible to prevent the occurrence of burrs around the protrusion part 3a without reduction in workability of molding and eliminate the need for burr trimming, thereby achieving productivity improvement and labor cost cutting.

Next, other embodiments in which the configuration of the opening/closing means 40 of the insert holding means 30 is partly modified will be described. The same members will be given the same reference signs and detailed descriptions thereof will be omitted.

Figure 10A:
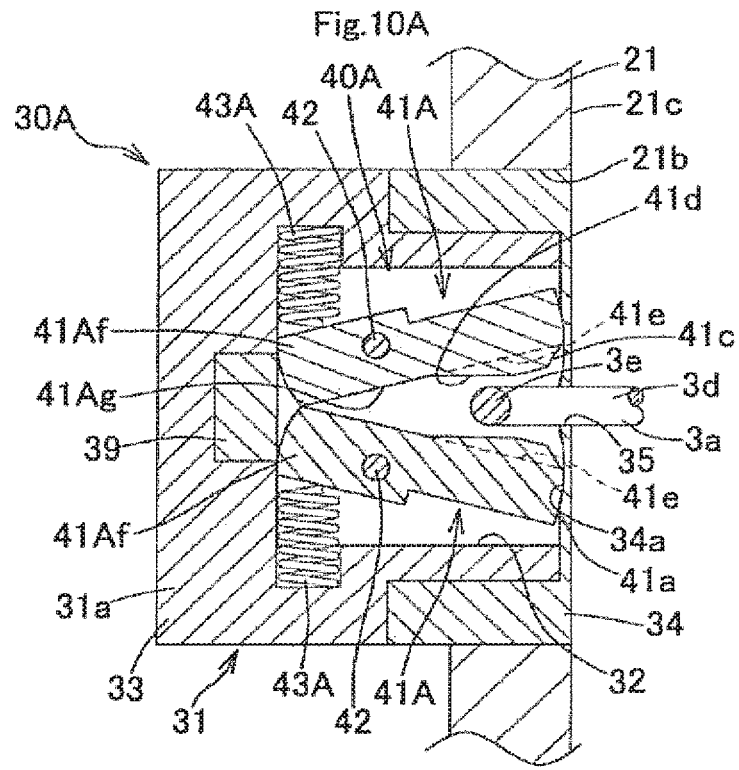
FIG. 10A is a transverse cross-sectional view of an insert holding means including another opening/closing means in which a fastening part is passing through an opening/closing part and FIG. 10B is a transverse cross-sectional view of the insert holding means with the fastening part inserted.

(1) In the opening/closing means 40, the pair of opening/closing parts 41 is constantly biased to the closing position. Alternatively, as in an opening/closing means 40A of an insert holding means 30A illustrated in FIG. 10, opening/closing parts 41A may be constantly biased to the opening position.

Figure 10B:
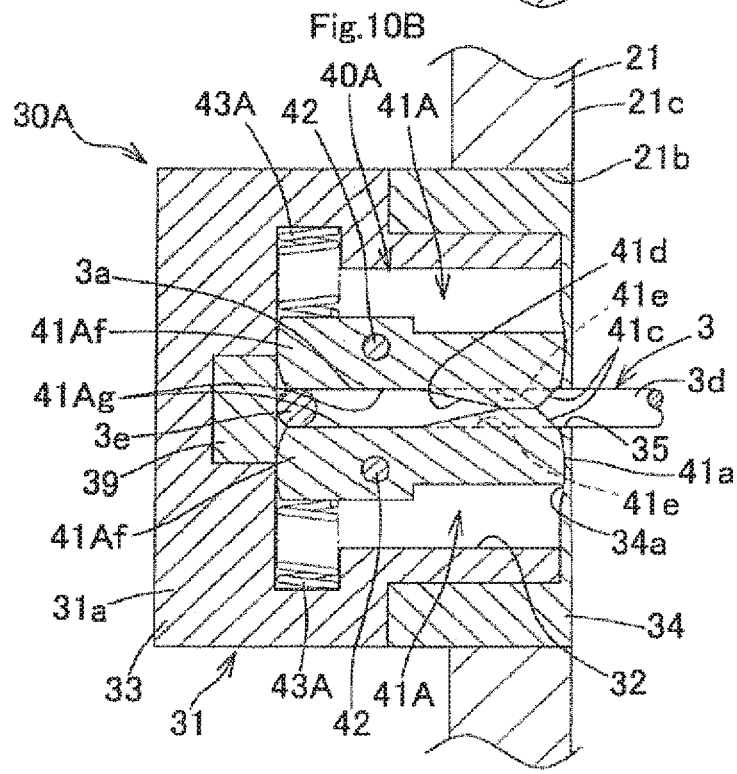

The opening/closing parts 41A of the opening/closing means 40A will be described only by the differences from the opening/closing parts 41. The opening/closing parts 41A have at the base ends extension portions 41Af extending from the support shafts 42 up to the vicinities of the bottom surface parts 31a of the main bodies 33. The opening/closing parts 41A also have closing operation surfaces 41Ag (equivalent to closing operation parts) inclined such that the bottom surface parts 31a side of the closing operation surfaces 41Ag are closer to each other in the opening position illustrated in FIG. 10A on the opposed sides of the extension portions 41Af. Biasing means 43A are provided between side walls of the extension portions 41Af and the main bodies 33 to bias constantly the opening/closing parts 41A to the opening position. The opening/closing parts 41 are held in the opening position by the biasing force of the biasing means 43A until the insertion of the protrusion part 3a into the accommodation concave part 32. When the protrusion part 3a is inserted into the accommodation concave part 32 and the coupling portion 3e of the protrusion part 3a is inserted between the closing operation surfaces 41Ag, the closing operation surfaces 41Ag are laterally pressed by the coupling portion 3e of the protrusion part 3a, the opening/closing parts 41A turn to the closing position as illustrated in FIG. 10B. When the protrusion part 3a is inserted until it abuts on the permanent magnet 39, the protrusion part 3a is attracted and held by the permanent magnet 39 to hold the opening/closing parts 41A in the closing position. In addition, when the protrusion part 3a is operated from the accommodation concave part 32 in the direction of extraction, the opening/closing parts 41A turn to the opening position by the biasing force of the biasing means 43A to open the insertion hole 35, and the protrusion part 3a can be extracted from the accommodation concave part 32.

The biasing means 43A can be composed of compression coil springs as illustrated in FIG. 10 or can be composed of extension coil springs, plate springs, or the like as far as they bias constantly the opening/closing parts 41A to the opening position.

In the opening/closing means 40A, the opening/closing parts 41A are constantly biased by the biasing means 43A to the opening position, and therefore the insertion opening operation surfaces 41c and the extraction opening operation surfaces 41d can be omitted. Accordingly, when the opening/closing parts 41A are closed, the recessions exposed to the cavity CA by the insertion opening operation surfaces 41c are eliminated, thereby preventing more effectively the occurrence of burrs near the protrusion part 3a.

Alternatively, the biasing means 43A may be omitted and a braking means may be provided to give an operation resistance by friction or the like to the turning of the opening/closing parts 41A so that, when the protrusion part 3a is extracted from the accommodation concave part 32, the coupling portion 3e of the protrusion part 3a abuts on the extraction opening operation surfaces 41d to operate the opening/closing parts 41A to the opening position, and the opening/closing parts 41A are held by the braking means in the opening position, and when the protrusion part 3a is inserted into the accommodation concave part 32, the coupling portion 3e of the protrusion part 3a operates the closing operation surfaces 41Ag to the outside to operate the opening/closing parts 41A to the closing position.

(2) In the opening/closing means 40, the opening/closing parts 41 and the biasing means 43 are formed from different members. Alternatively, as in an opening/closing means 40B of an insert holding means 30B illustrated in FIG. 11, opening/closing parts 41B composed of plate springs may be used to integrate the opening/closing parts 41 and the biasing means 43 and eliminate the support shafts 42, thereby decreasing the number of the components.

The opening/closing means 40B will be described. The pair of opening/closing parts 41B composed of plate springs is opposed to the insertion position of the protrusion part 3a in the accommodation concave part 32. The pair of opening/closing parts 41B has in the opposed surfaces insertion opening operation surfaces 41c, extraction opening operation surfaces 41d, and a pair of fitting grooves 41e as in the case with the opening/closing parts 41. The opening/closing parts 41B have displacement facilitation parts 41Bh with ends fixed to the casing 31 that are connected to the ends on the insertion hole 35 sides. In the opening/closing means 40B, when the protrusion part 3a is inserted into the accommodation back part, the insertion opening operation surfaces 41c are pressed and operated by the protrusion part 3a, and the protrusion part 3a is inserted while the opening/closing parts 41B are operated to the opening position illustrated in FIG. 11A. When the coupling portion 3e of the protrusion part 3a passes through the opening/closing parts 41B, the opening/closing parts 41B are returned by the biasing force of the opening/closing parts 41B to the closing position illustrated in FIG. 11B. Meanwhile, when the protrusion part 3a is operated in the direction of extraction to extract the protrusion part 3a from the accommodation concave part 32, the extraction opening operation surfaces 41d are laterally operated by the coupling portion 3e of the protrusion part 3a and the protrusion part 3a is extracted from between the opening/closing parts 411B. The opening/closing parts 41B may be configured in an arbitrary manner except for their opposed parts as far as the opposed parts can be switched between the opening position and the closing position by elastic deformation of the opening/closing parts 41B. For example, although the insertion hole 35 sides of the opening/closing parts 41B are fixed to the casing 31, the bottom surface part 31a sides of the opening/closing parts 41B may be fixed to the casing 31.

(3) As in an opening/closing means 40C of an insert holding means 30C illustrated in FIG. 12, one opening/closing part 41C and one support shaft 42 may be provided such that the opening/closing part 41C is supported so as to be capable of swinging between the opening position illustrated in FIG. 12A and the closing position illustrated in FIG. 12B. In this case, a casing 31C including a small-sized main body 33C and lid member 34C may be used.

The opening/closing means 40C will be described. The opening/closing part 41C is arranged at one side of the protrusion part 3a inserted into an accommodation concave part 32C of the casing 31C, and has a base end turnably supported by the support shaft 42 and a leading end extended up to the lid member 34C. The opening/closing part 41C has at the leading end a closing surface 41Ca sized to close the insertion hole 35 in the closing position. The closing surface 41Ca is formed in an arc surface centered on the support shaft 42. The surface of the lid member 34C opposed to the closing surface 41Ca has an arc surface 34Ca centered on the support shaft 42. The opening/closing part 41C can close the insertion hole 35 almost without gap by eliminating almost completely the gap between the closing surface 41Ca of the opening/closing part 41C and the corresponding arc surface 34Ca of the lid member 34C.

The opening/closing part 41C has an operation projection 41Cb protruded with a height larger than the diameter of the leg portion 3d from the leading end of the side surface on the side of the protrusion part 3a inserted into the accommodation concave part 32C. The operation projection 41Cb has at the leading end an insertion opening operation surface 41Cc (equivalent to an insertion-side opening operation part) composed of an inclined surface that, when the protrusion part 3a is inserted into the accommodation concave part 32C, abuts on the leading end of the protrusion part 3a to operate the opening/closing part 41C to the opening position. The operation projection 41b has at the base end an extraction opening operation surface 41Cd composed of an inclined surface that, when the protrusion part 3a is extracted from the accommodation concave part 32, abuts on the leading end of the protrusion part 3a to operate the opening/closing part 41C to the opening position.

The operation projection 41Cb has in the width-direction middle portion a pair of fitting grooves 41Ce that have a depth larger than the diameter of the leg portions 3d and fit with the leg portions 3d. However, the width of the opening/closing part 41C may be set to the same as the distance between the centers of the leg portions 3d as in the foregoing embodiment to form a pair of ¼ cylindrical fitting grooves on the both width-direction ends of the opening/closing part. In addition, when the occurrence of slight burrs is allowed, the width of the opening/closing part may be slightly smaller than the distance between the centers of the leg portions 3d.

The opening/closing part 41C of the opening/closing means 40C is constantly held in the closing position by the biasing means 43 as illustrated in FIG. 12B. To insert the protrusion part 3a into the insertion hole 35, the coupling portion 3e of the protrusion part 3a first abuts on the insertion opening operation surface 41Cc to operate the opening/closing part 41C to the opening position. Then, the protrusion part 3a is inserted into the accommodation concave part 32C and the coupling portion 3e of the protrusion part 3a is attracted and held by the permanent magnet 39. To extract the protrusion part 3a from the accommodation concave part 32C, the coupling portion 3e of the protrusion part 3a abuts on the extraction opening operation surface 41Cd to operate the opening/closing part 41C to the opening position, whereby the protrusion part 3a can be extracted from the accommodation concave part 32C. When the protrusion part 3a is extracted, the opening/closing part 41C is turned by the biasing means 43 to the closing position.

Figure 13A:
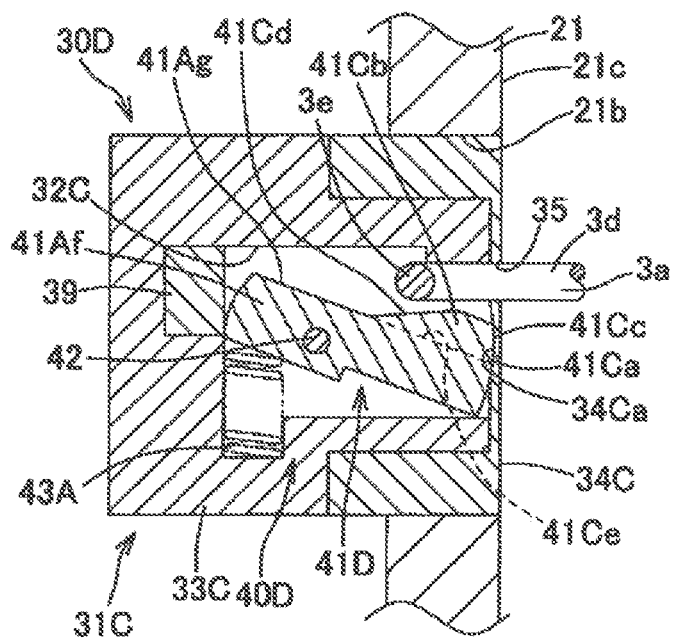
FIG. 13A is a transverse cross-sectional view of an insert holding means including another opening/closing means in which a fastening part is passing through an opening/closing part and FIG. 13B is a transverse cross-sectional view of the insert holding means with the fastening part inserted.
Figure 13B:
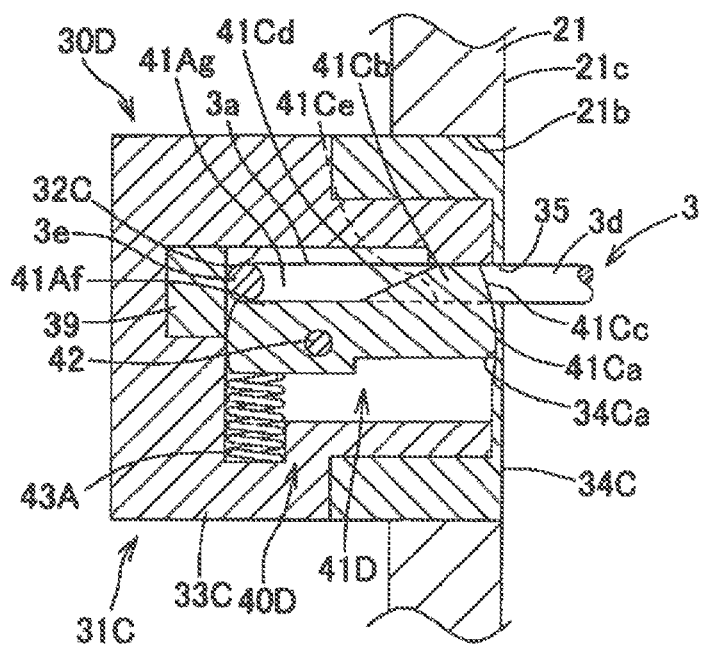

The opening/closing means 40A or 40B may include only one opening/closing part 41A or 41B as the opening/closing means 40C does. For example, in the case of biasing constantly the opening/closing part 41A to the opening position as in the opening/closing means 40A, an extension portion 41Af and a closing operation surface 41Ag are formed at the base end of the opening/closing part 41C in the same manner as the opening/closing part 41A, as an opening/closing part 41D of an opening/closing means 40D of the insert holding means 30D illustrated in FIG. 13. Accordingly, when the protrusion part 3a is inserted into the accommodation concave part 32C, the coupling portion 3e of the protrusion part 3a abuts on the closing operation surface 41Ag and the opening/closing part 41D turns to the closing position illustrated in FIG. 13B to close the insertion hole 35. When the protrusion part 3a is extracted from the accommodation concave part 32C, the opening/closing part 41D is turned by a biasing means 43A to the opening position to open the insertion hole 35 as illustrated in FIG. 13A.

The opening/closing means can be arbitrarily configured as far as it allows insertion and extraction of the protrusion part 3a into and from the accommodation concave part 32 and it can close the insertion hole 35 when the protrusion part 3a is inserted into the accommodation concave part 32. For example, an opening/closing part capable of sliding in a direction orthogonal to the direction of insertion of the protrusion part 3a may be provided to open and close the insertion hole 35 by the sliding of the opening/closing part.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

REFERENCE SIGNS LIST

1 Molded article
2 Anchor material
2a Anchor side part
2b Anchor side part
3 Fastening member
3a Protrusion part
3b Fixing part
3c Fastening part
3d Leg portion
3e Coupling portion
4 Insert member
5 Foaming molded body
5a Projection
5b Foundation portion
5c Rising portion
6 Vehicle seat
7 Molded body
8 Attachment plate
3A Fastening member
3Ab Fixing part
3Ac Fastening part
3B Fastening member
3Bb Fixing part
3Bc Fastening part
3C Fastening member
3Cb Fixing part
3Cc Fastening part
3D Fastening member
3Db Fixing part
3Dc Fastening part
3E Fastening member
3Eb Fixing part
3Ec Fastening part
3F Fastening member
3Fb Fixing part
3Fc Fastening part
3G Fastening member
3Gb Fixing part
3Gc Fastening part
CA Cavity
M Mold apparatus
10 Concave mold unit
11 Concave mold
11a Vent hole
12 Concave mold housing
13 Concave mold frame
14 Center plate
15 Concave mold back plate
16 Concave mold chamber
17 Filling gun
18a Steam supply pipe
18b Cooling water supply pipe
18c Drain pipe
18d Nozzle
19a to 19c Control valve
20 Convex mold unit
21 Convex mold
21a Vent hole
21b Attachment hole
21c Molding surface
22 Convex mold housing
23 Convex mold frame
24 Center plate
25 Convex mold back plate
26 Convex mold chamber
28a Air supply pipe
28b Cooling water supply pipe
28c Drain pipe
28d Nozzle
29a to 29c Control valve
30 Insert holding means
31 Casing
31a Bottom surface part
32 Accommodation concave part
33 Main body
34 Lid member
34a Arc surface 35 Insertion hole
39 Permanent magnet
40 Opening/closing means
41 Opening/closing part
41a Closing surface
41b Operation projection
41c Insertion opening operation surface
41d Extraction opening operation surface
41e Fitting groove
42 Support shaft
43 Biasing means
44 Beads discharge hole
30A Insert holding means
40A Opening/closing means
41A Opening/closing part
41Af Extension portion
41Ag Closing operation surface
43A Biasing means
30B Insert holding means
40B Opening/closing means
41B Opening/closing part
41Bh Displacement facilitation part
30C Insert holding means
31C Casing
32C Accommodation concave part
33C Main body
34C Lid member
34Ca Arc surface
40C Opening/closing means
41C Opening/closing part
41Ca Closing surface
41Cb Operation projection
41Cc Insertion opening operation surface
41Cd Extraction opening operation surface
41Ce Fitting groove
30D Insert holding means
4D Opening/closing means
41D Opening/closing part

The invention claimed is:

1. A mold for in-mold foam molding of polyolefin-based resin comprising:
an accommodation concave part configured for accommodating a protrusion part of an insert member;
an opening/closing part configured for opening a cavity-side opening of the accommodation concave part upon insertion of the protrusion part into the accommodation concave part and for closing the cavity-side opening of the accommodation concave part upon extraction of the protrusion part from the accommodation concave part; and
a biasing means configured for constantly biasing the opening/closing part to a closing position that is configured to close a gap between a rim of the cavity-side opening and an outer periphery of a base portion of the protrusion part,
wherein the opening/closing part comprises:
an insertion-side opening operation part that abuts on the protrusion part and operates the opening/closing part to an opening position according to the insertion of the protrusion part into the accommodation concave part; and
an extraction-side opening operation part that abuts on the protrusion part and operates the opening/closing part to the opening position according to the extraction of the protrusion part from the accommodation concave part, and wherein the opening/closing part is configured for swinging between the opening position at which the cavity-side opening is opened and the closing position at which the cavity side opening is closed.

2. A mold for in-mold foam molding of polyolefin-based resin comprising:
an accommodation concave part configured for accommodating a protrusion part of an insert member;
an opening/closing part configured for closing a cavity-side opening of the accommodation concave part upon insertion of the protrusion part into the accommodation concave part and for opening the cavity-side opening of the accommodation concave part upon extraction of the protrusion part from the accommodation concave part; and
a biasing means configured for constantly biasing the opening/closing part to an opening position,
wherein the opening/closing part comprises a closing operation part that abuts on the protrusion part and operates the opening/closing part to a closing position upon the insertion of the protrusion part into the accommodation concave part, and
wherein the opening/closing part is configured for swinging between the opening position and the closing position that is configured to close a gap between a rim of the cavity-side opening and an outer periphery of a base portion of the protrusion part.

3. A mold for in-mold foam molding of polyolefin-based resin comprising:
an accommodation concave part configured for accommodating a protrusion part of an insert member; and
an opening/closing part configured for opening a cavity-side opening of the accommodation concave part upon insertion of the protrusion part into the accommodation concave part and for closing the cavity-side opening of the accommodation concave part upon extraction of the protrusion part from the accommodation concave part,
wherein the opening/closing part comprises:
an insertion-side opening operation part that abuts on the protrusion part and operates the opening/closing part to an opening position according to the insertion of the protrusion part into the accommodation concave part; and
an extraction-side opening operation part that abuts on the protrusion part and operates the opening/closing part to the opening position according to the extraction of the protrusion part from the accommodation concave part, and
wherein the opening/closing part is elastically deformable between the opening position and a closing position that is configured to close a gap between a rim of the cavity-side opening and an outer periphery of a base portion of the protrusion part, wherein the opening/closing part is constantly biased to the closing position.

4. The mold for in-mold foam molding of polyolefin-based resin according to claim 1, wherein the cavity-side opening is formed in an elongated hole shape fitting to a front shape of the protrusion part in a mold opening/closing direction.

5. The mold for in-mold foam molding of polyolefin-based resin according to claim 1, wherein the opening/closing part comprises:
a set of two opening/closing parts, the two opening/closing parts being arranged on both sides of the protrusion part in a manner to sandwich the protrusion part therebetween, and configured for the opening and the closing of the cavity-side opening in cooperation with each other, with the protrusion part being in the accommodation concave part.

6. The mold for in-mold foam molding of polyolefin-based resin according to claim 1, wherein the opening/closing part comprises:
   a single opening/closing part provided on one side of the protrusion part inserted in the accommodation concave part.

7. The mold for in-mold foam molding of polyolefin-based resin according to claim 1, further comprising:
   a magnet on a bottom surface of the accommodation concave part configured to attract and hold the protrusion part.

8. The mold for in-mold foam molding of polyolefin-based resin according to claim 1, further comprising:
   a steam chamber on a back side of the mold;
   a beads discharge hole configured for discharging pre-expanded beads in the accommodation concave part, the beads discharge hole communicating with the steam chamber.

9. The mold for in-mold foam molding of polyolefin-based resin according to claim 1, wherein a maximum gap between the accommodation concave part and a cavity is set to be 0.5 mm or more to 2.0 mm or less, in a state that the cavity-side opening is closed by the opening/closing part.

10. The mold for in-mold foam molding of polyolefin-based resin according to claim 2, wherein the cavity-side opening is formed in an elongated hole shape fitting to a front shape of the protrusion part in a mold opening/closing direction.

11. The mold for in-mold foam molding of polyolefin-based resin according to claim 2, wherein the opening/closing part comprises:
   a set of two opening/closing parts, the two opening/closing parts being arranged on both sides of the protrusion part in a manner to sandwich the protrusion part therebetween, and configured for the opening and the closing of the cavity-side opening in cooperation with each other, with the protrusion part being in the accommodation concave part.

12. The mold for in-mold foam molding of polyolefin-based resin according to claim 2, wherein the opening/closing part comprises:
   a single opening/closing part provided on one side of the protrusion part inserted in the accommodation concave part.

13. The mold for in-mold foam molding of polyolefin-based resin according to claim 2, further comprising:
   a magnet on a bottom surface of the accommodation concave part configured to attract and hold the protrusion part.

14. The mold for in-mold foam molding of polyolefin-based resin according to claim 2, further comprising:
   a steam chamber on a back side of the mold;
   a beads discharge hole configured for discharging pre-expanded beads in the accommodation concave part, the beads discharge hole communicating with the steam chamber.

15. The mold for in-mold foam molding of polyolefin-based resin according to claim 2, wherein a maximum gap between the accommodation concave part and a cavity is set to be 0.5 mm or more to 2.0 mm or less, in a state that the cavity-side opening is closed by the opening/closing part.

16. The mold for in-mold foam molding of polyolefin-based resin according to claim 3, wherein the cavity-side opening is formed in an elongated hole shape fitting to a front shape of the protrusion part in a mold opening/closing direction.

17. The mold for in-mold foam molding of polyolefin-based resin according to claim 3, wherein the opening/closing part comprises:
   a set of two opening/closing parts, the two opening/closing parts being arranged on both sides of the protrusion part in a manner to sandwich the protrusion part therebetween, and configured for the opening and the closing of the cavity-side opening in cooperation with each other, with the protrusion part being in the accommodation concave part.

18. The mold for in-mold foam molding of polyolefin-based resin according to claim 3, wherein the opening/closing part comprises:
   a single opening/closing part provided on one side of the protrusion part inserted in the accommodation concave part.

19. The mold for in old foam molding of polyolefin-based resin according to claim 3, further comprising:
   a magnet on a bottom surface of the accommodation concave part configured to attract and hold the protrusion part.

20. The mold for in-mold foam molding of polyolefin-based resin according to claim 3, further comprising:
   a steam chamber on a back side of the mold;
   a beads discharge hole configured for discharging pre-expanded beads in the accommodation concave part, the beads discharge hole communicating with the steam chamber.

21. The mold for in-mold foam molding of polyolefin-based resin according to claim 3, wherein a maximum gap between the accommodation concave part and a cavity is set to be 0.5 mm or more to 2.0 mm or less, in a state that the cavity-side opening is closed by the opening/closing part.

* * * * *